(12) United States Patent
Fischel

(10) Patent No.: US 8,187,737 B2
(45) Date of Patent: May 29, 2012

(54) GALVANIC ELECTROCHEMICAL CELLS UTILIZING TAYLOR VORTEX FLOWS

(75) Inventor: Halbert Fischel, Santa Barbara, CA (US)

(73) Assignee: Global Energy Science, LLC, Santa Barbara, CA (US)

( * ) Notice: Subject to any disclaimer, the term of this patent is extended or adjusted under 35 U.S.C. 154(b) by 0 days.

(21) Appl. No.: 13/235,480

(22) Filed: Sep. 18, 2011

(65) Prior Publication Data

US 2012/0003518 A1 Jan. 5, 2012

Related U.S. Application Data

(60) Continuation-in-part of application No. 13/194,049, filed on Jul. 29, 2011, which is a division of application No. 12/800,658, filed on May 20, 2010, now Pat. No. 8,017,261.

(60) Provisional application No. 61/220,583, filed on Jun. 26, 2009.

(51) Int. Cl.
*H01M 2/38* (2006.01)
(52) U.S. Cl. ............ 429/67; 429/69; 429/416; 429/451; 429/498
(58) Field of Classification Search .................. 429/67, 429/69, 416, 451, 498
See application file for complete search history.

(56) References Cited

U.S. PATENT DOCUMENTS

| 5,830,593 A | 11/1998 | Nielson |
| 6,319,293 B1 | 11/2001 | Debe et al. |
| 6,713,206 B2 | 3/2004 | Markoski et al. |
| 7,488,547 B1 | 2/2009 | Iacovelli |
| 2007/0020142 A1 | 1/2007 | Federspiel et al. |

OTHER PUBLICATIONS

Gabe et al, The rotating cylinder electrode: a recent development, Reviews of Applied Electrochemistr . of Applied Electrochemistr (1983) pp. 3-22.
Gabe et al, The rotating cylinder electrode: its continued development and application, Reviews of Applied Electrochemistry 49, J. of Applied Electrochemistr (1998) pp. 759-780.
Bagotsky, Fundamentals of Chemistry, Second Edition, John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.
Taylor, Stability of a Viscous Liquid Contained Between Two Rotating Cylinders, Philosophical Transactions of the Royal Society of London. Series A, Containing Papers of a Mathematical of Physical Character, vol. 223 (1923) pp. 289-343.

(Continued)

*Primary Examiner* — Jane Rhee
(74) *Attorney, Agent, or Firm* — Sheldon L. Epstein; Malcolm J. Chisholm, Jr.; Pamela J. Curbelo

(57) ABSTRACT

Electrochemical cells (100, 500, 600) for converting chemical energy into electrical energy, such as batteries (102), flow cells (502) and fuel cells (602) with a cylindrical rotating ion-permeable filter (120, 414, 520, 620) that generates Taylor Vortex Flows (144, 146, 404, 544, 546, 664, 666) and Circular Couette Flows (148, 150, 568, 570, 668, 670) in thixotropic catholytes and anolytes between a cylindrical current collector (106, 506, 606, 108, 508, 608) and the filter (120, 414, 520, 620) are disclosed.

18 Claims, 7 Drawing Sheets

OTHER PUBLICATIONS

Newman, Electrochemical Systems, Third Edition, John Wiley & Sons, Inc., Hoboken, NJ, USA, © 2004, Chapter 1—Introduction, §1.4 Transport, pp. 8-18.

Bagotsky, Fundamentals of Chemistr Edition, John Wiley & Sons, Inc., Hoboken, NJ, USA, © 2006, Preface to First Edition, pp. xix-xxi & §1.6 Classification of Electrodes and Electrode Reactions, pp. 12-15.

Newman, Electrochemical Systems, Third Edition, John Wiley & Sons, Inc., Hoboken, NJ, USA, © 2004, Preface to the First Edition, pp. xix-xx & §1.2 Thermodynamics and Potential, pp. 4-7.

Pletcher & Walsh, Industrial Electrochemistr II, London, UK, © 1982, Preface pp. viii-x; Chapter 7, §(d) pp. 346-350 & Chapter 11, p. 543.

R. Ferrigno et al, "Membraneless Vanadium Redox Fuel Cell Using Laminar Flow", JACS Communications, vol. 124, 2002, pp. 12930-12931.

*BATTERY*

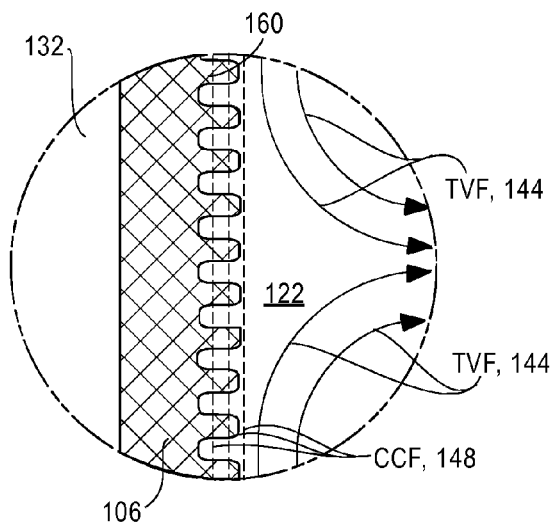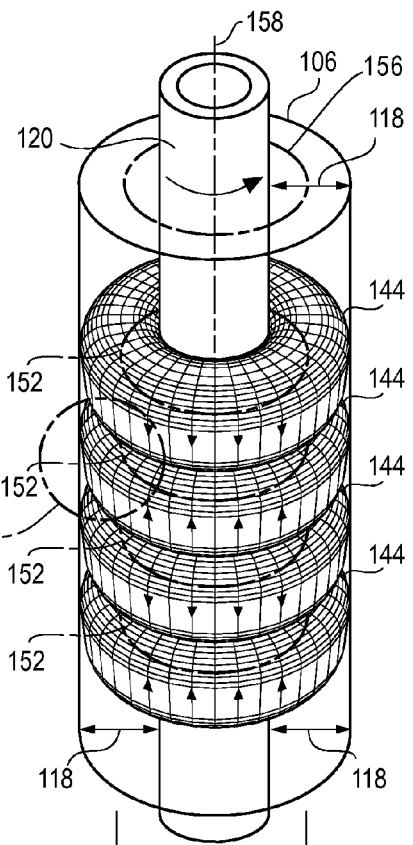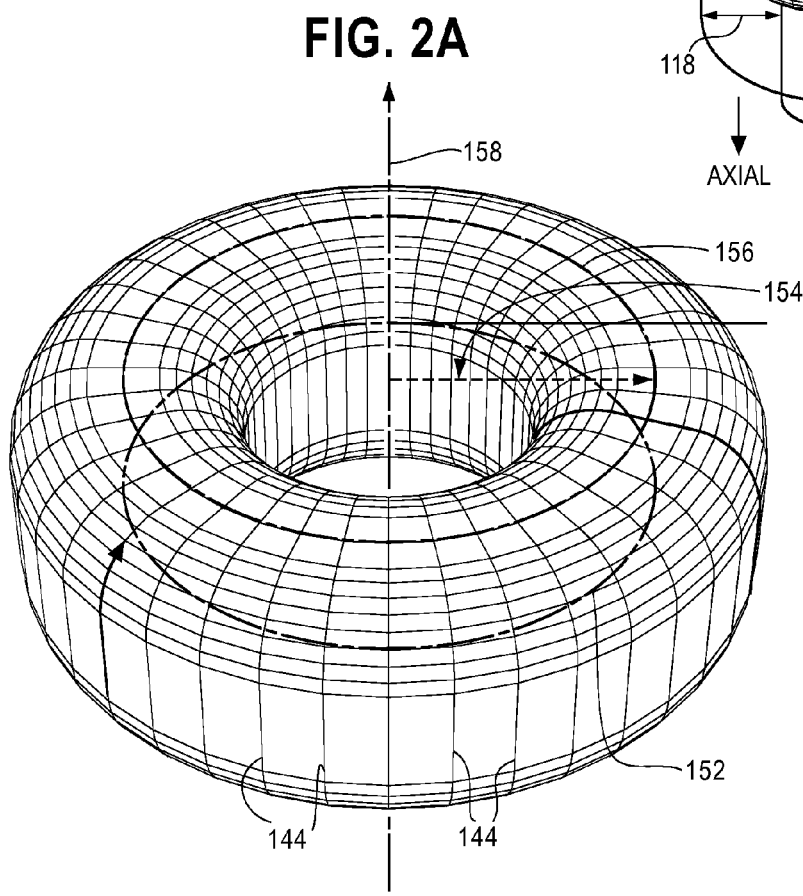

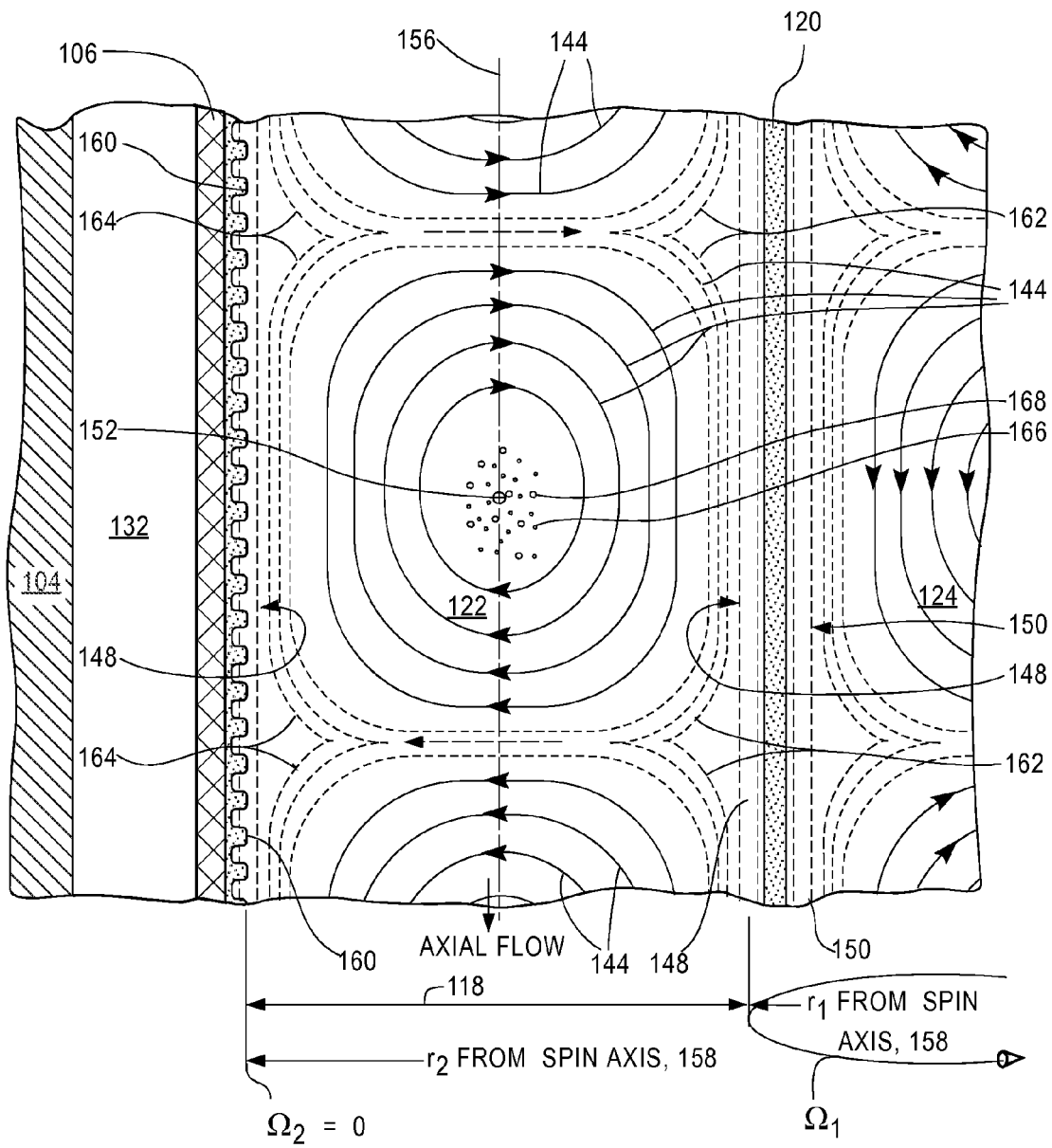

*REDOX FLOW CELL*

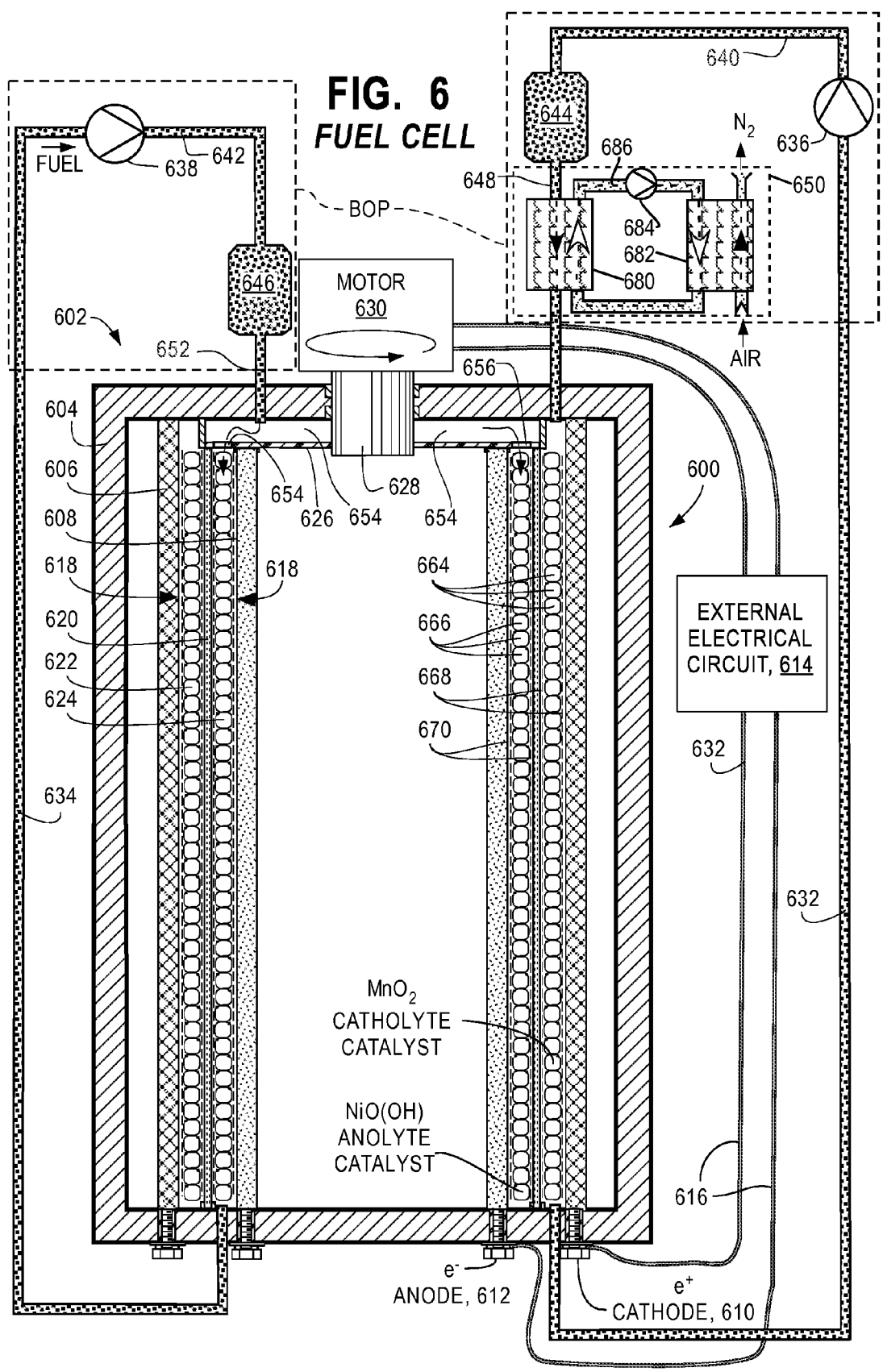

GALVANIC ELECTROCHEMICAL CELLS UTILIZING TAYLOR VORTEX FLOWS

CROSS-REFERENCE TO RELATED APPLICATIONS

This application is a continuation-in-part of U.S. patent application Ser. No. 13/194,049 of 29 Jul. 2011 that is a division of U.S. patent application Ser. No. 12/800,658 filed 20 May 2010, now U.S. Pat. No. 8,017,261 of 13 Sep. 2011, which claims the benefit of my U.S. Provisional Application No. 61/220,583 filed 26 Jun. 2009.

This application, identified as Case A2, is related to the following applications of Halbert P. Fischel:
- Case A: Electrochemical Cells Utilizing Taylor Vortex Flows, Ser. No. 12/800,658 of 20 May 2010, now U.S. Pat. No. 8,017,261 of 13 Sep. 2011;
- Case A1: Electrochemical Cells Utilizing Taylor Vortex Flows, Ser. No. 13/194,049 of 29 Jul. 2011;
- Case B: Fuel Reformers Utilizing Taylor Vortex Flows, application Ser. No. 12/800,710 of 20 May 2010, now Publication No. US 2010/0330445 A1 of 30 Dec. 2010;
- Case C: Chemical Process Accelerator Systems Comprising Taylor Vortex Flows, application Ser. No. 12/800,657 of 20 May 2010, now Publication No. US 2010/0329947 A1 of 30 Dec. 2010
- Case D: Direct Reaction Fuel Cells Utilizing Taylor Vortex Flows, application Ser. No. 12/800,672 of 20 May 2010, now U.S. Pat. No. 7,972,747 of 5 Jul. 2011; and
- Case E: Dynamic Accelerated Reaction Batteries, application Ser. No. 12/800,709 of 20 May 2010 with Philip Michael Lubin and Daniel Timothy Lubin, now U.S. Pat. No. 7,964,301 of 21 Jun. 2011.

The enumerated applications are incorporated herein by reference in their entirety.

COMMON OWNERSHIP OF RELATED APPLICATIONS

All rights to this application and all of the enumerated applications and patents, including all of the inventions described and claimed in them, have been assigned to the same assignee so that there was common ownership of all of these applications and patents at the time the invention described and claimed below was made.

FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF INVENTION

1. Field of the Invention

This invention is in the field of galvanic electrochemical cells used to convert chemical energy into electrical energy (e.g. fuel cells) or store electrical energy as chemical energy (e.g., batteries and flow cells) having means to provide relative motion between an electrode and an electrolyte—including means for creating Taylor Vortex Flows (TVF) and Circular Couette Flows (CCF) in the electrolyte (U.S. Class 429/67,454; Int. Class H01M-2/38) to achieve accelerated chemical reaction rates in electrolytes containing faradaic or catalytic flakes (U.S. Class 429/105; Int. Class H01M-4/36).

2. Description of Related Art

Galvanic electrochemical cells include fuel cells used to convert chemical energy into electrical energy as well as batteries and flow cells used to store electrical energy in chemical form through reversible reactions (secondary cells) or irreversible reactions (primary cells). Their electrodes contain faradaic materials that support reduction-oxidation (redox) chemical reactions at the electrodes. Galvanic cells produce spontaneous reactions and are distinguished from electrolytic electrochemical cells that require electrical energy to initiate and sustain electrochemical reactions (e.g., electrowinning) that are usually irreversible. Also, electrolytic cell electrodes do not contain faradaic materials.

As used here, the term galvanic materials includes faradaic materials that support reduction-oxidation (redox) reactions and catalytic materials. In general, galvanic cells comprising, in one case, a pair of electrodes comprising faradaic materials that promote two (metal-electrolyte) or, in another case, three (catalyst-fuel or oxidizer-electrolyte) phase electrochemical reactions that separate electrons or ions from atoms or molecules, which then become energized ions (e.g., protons). The electrons travel from one electrode to the other electrode through an external electrical circuit where work is performed while the ions travel through a fluid electrolyte between the electrodes. This invention focuses on improving galvanic cell performance by providing novel means for enhancing electrolyte performance to lower loss of energy by ions transiting fluid electrolytes or by electrons entering electrodes—especially in non-Newtonian fluids.

Fluid electrolytes include aqueous alkaline solutions (e.g., KOH), aqueous acid solutions (e.g., $H_2SO_4$), carbonates (e.g., propylene carbonate) and organics (e.g., dimethylformamide). In many cases, these electrolytes are classified as Newtonian fluids; that is, their viscosities do not change as a function of shear rate.

Ion movement through electrolytes between the electrodes in many galvanic cells proceeds only under the influence of diffusion, migration and electric field gradients. A few cells pump electrolyte, which introduces convection gradients that are many times those of other gradients; but, may cause energy dissipating turbulent flows as pumping rates increase. My introduction of means for generating laminar highly correlated Taylor Vortex Flows (TVF) and Circular Couette Flows (CCF) in fuel cells (Cases A and D) and batteries (Case E) taught how to create very large convection gradients with high-shear-rate laminar electrolyte flows that accelerate galvanic reactions. The disclosed embodiments used KOH—a Newtonian fluid—as electrolytes; although no such limitation was taught.

Patent Publication No. US2010/0047671 of 25 Feb. 2010 to Chiang et al for a High Energy Density Redox Flow Device; Patent Publication No. US2011/0189520 of 4 Aug. 2011 to Carter et al for a High Energy Density Redox Flow Device; Patent Publication No. US2011/0200848 of 18 Aug. 2011 to Chiang et al for a High Energy Density Redox Flow Device and Duduta et al, *Semi-Solid Lithium Rechargeable Flow Battery*, Advanced Energy Materials (20 May 2011), Vol. 1, pp. 511-516, teach electrochemical flow cells containing a pair of high volumetric energy density fluid electrolytes that have high molar faradaic material content (i.e., 10-molar or greater). One electrolyte incorporates positive faradaic particles (catholyte) and while the other electrolyte contains negative faradaic particles (anolyte). The catholyte and anolyte each act as electrodes in promoting redox reactions when pumped through individual reaction chambers—each comprising an electric current collector connected to an external electrical circuit.

High volumetric energy density fluid electrolytes containing high-molar-concentrations of galvanic particles are non-Newtonian fluids. They can be or can contain colloidal suspensions (sols), slurries, gels, emulsions, micelles or thixotropic fluids. Their viscosities may remain constant or may change when pumped through a cell. For example, the viscosity of a thixotropic fluid will decrease at higher shear rates in a shear gradient flow field or over time at a constant shear rate while the viscosity of an anti-thixotropic fluid will increase under the same conditions.

In several prior art embodiments, the positive and the negative faradaic solubles or particles are each, respectively, dissolved or suspended in a solvent common to both electrolytes to provide catholytes and anolytes—each containing its own polarity of faradaic ions. Then the catholyte is pumped into or past a cathode while the anolyte is pumped through or past an anode. The electrolytes are prevented from mixing by a membrane or filter that permits ions and, in some cases, solvent to pass; but, blocks the passage of faradaic particles.

Chiang et al teach that the filter keeps the catholyte and anolyte faradaic particles separate; but, not the electrolyte when shared by both chambers. By contrast, one embodiment of my Case E (shown as FIG. 5) teaches a battery containing an ion-membrane that is not porous to two dissimilar electrolytes. The membrane of my Case E is specifically semipermeable to lithium ion and nothing else, especially electrolyte.

Chiang et al teach that the faradaic particles reside in their separate electrolytes and not in electrodes. The particles, themselves, form the cell's electrodes. These electrodes are described as semi-solid or condensed ion storing liquid reactant ('848 at ¶[0012]). Chiang et al then state:

> By "semi-solid" it is meant that the material is a mixture of liquid and solid phases, for example, such as a slurry, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redoxactive. Of course, such a liquid form may also be diluted by or mixed with another, non-redox-active liquid that is a diluent or solvent, including mixing with such a diluent to form a lower-melting-temperature liquid phase, emulsion, or micelles including the ion-storing liquid.

Therefore, these "semi-solid" and "condensed ion-storing liquid" electrolytes are non-Newtonian fluids (Duduta et al, FIG. 2, p. 513) that act as prior art electrodes because they can initiate redox reactions with fuels (e.g., $H_2$) and oxidizers (e.g., $O_2$) in fuel cells and sustain faradaic reactions in batteries and flow cells. These characteristics permit the use of simple, easy-to-construct electric current collectors in place of complex, expensive porous electrodes.

However, there is a price to pay when using "semi-solid" and "condensed ion storing" electrolytes as taught by Chiang et al and Duduta et al; namely, a need for an electrolyte pump to provide a convection gradient that can overcome electrolyte viscosity, which is a major concern for their long, narrow electrolyte chambers. These electrolytes contain a mixture of faradaic particles (e.g., $LiCoO_2$) and carbon particles (e.g., KETJENBLACK® porous electroconductive carbon particles) that can transfer charges from the faradaic materials to the current collectors.

The Chiang et al and the Duduta et al electrochemical processes proceed by promoting a faradaic reaction at the surface of a faradaic particle that creates an electron or a hole (absence of electron) and the necessary simultaneous release or acquisition of an ion at the particle surface. In the case of an electron, the reaction can only proceed by attracting the electron to move from the faradaic particle surface to a nearby conductor, which may be the current collecting electrode metal surface or a carbon particle in contact with that surface. The released positively-charged ion is then free to move through the electrolyte solvent toward the other electrode. However, electron and hole transfers during random momentary contact between freely-suspended faradaic and carbon particles while either are in mutual contact with the metal surface is limited to a small percentage of collisions.

In the Chiang et al and the Duduta et al cells, a freely suspended faradaic particle must come into contact with a metal electric current collector that can transfer the electron to an external circuit. A freely-suspended carbon particle can only act as a conduit for electrons upon collision with the faradaic particle if it is itself in contact with a metal electric current collector. Since the diffusion, concentration and migration gradients for either particle in the electrolyte are small, a pump is required both to overcome fluid drag caused by long, narrow electrolyte chambers and to force the charged carbon or faradaic particle to contact the electric current collector. Chiang et al also teach a need for small-diameter chambers of 1 cm to 100 micrometers; probably, to increase the rate at which the several particles contact the chamber's walls and transfer their charges. A similar process—but in reverse—moves an electron from a carbon particle to fill a hole or electron vacancy.

An increase in pumping rate is effective in increasing cell electric current up to a point where turbulence occurs. Further increases in the pumping rate cause a decrease in cell electric current. My invention that is described below teaches how to overcome the limitations of galvanic cells (e.g., fuel cells, batteries, flow cells) through the use of TVF, CCF and improved high-molar, non-Newtonian electrolytes that contain novel particles.

GENERAL DESCRIPTION OF THE INVENTION

My Cases A, D and E teach the use of TVF and CCF to improve the performance of fuel cells and galvanic batteries incorporating a single electrolyte or two dissimilar electrolytes together with electrodes containing attached faradaic or catalyst particles and current collectors. Additionally, TVF (also known as Taylor-Couette Flows) enhances reaction rates in electrochemical cells by a) reducing mass-transport losses, b) preventing fuel and oxidizer crossover, c) capturing reaction products that can degrade catalysts and electrolytes and d) eliminating those degrading reaction products from the cells, e) increasing temperature to reduce electrode overpotentials and raise reaction rates and f) permitting higher pressures and concentrations to accelerate reactions at both electrodes. My Case A provides more complete description of TVF.

The present invention provides a galvanic electrochemical cell comprising:
a. a first outer cylinder-like current collector for connection to an external circuit;
b. an second inner cylinder-like current collector for connection to the external circuit and located within the first outer current collector so as to define a gap between the current collectors;
c. means for circulating a fluid electrolyte in the gap;
d. a cylinder-like, ion-permeable particulate filter located in the gap and dividing the gap between the outer and inner current collectors into outer and inner electrolyte chambers for flowing a different electrolyte in each of the chambers; and
e. means for providing relative rotation between the filter and a current collector to create Taylor Vortex Flows in the electrolyte of at least one electrolyte chamber.

In some embodiments, the galvanic cell also comprises means for creating TVF in electrolyte in the other electrolyte chamber so that electrolytes in both the outer and inner electrolyte chambers have TVF. TVF can also generate CCF in the electrolyte chambers.

The present invention also provides non-Newtonian electrolytes that eliminate any need for a galvanic material to randomly contact carbon particles in order to transfer electronic charges and permit a release or absorption of ions. In place of the faradaic material—carbon particle mixture taught by Chiang et al and Duduta et al, electrolytes of this invention comprise electroconductive carbon particles decorated with galvanic materials. The galvanic materials are affixed to the carbon particles and this feature permits important electrochemical reactions to proceed at accelerated rates using carbon as an intermediary. Other high surface area concentration electrically-conducting particles (ECP) (e.g., Raney nickel) can be substituted for carbon.

The present invention further provides means for accelerating charged particles decorated with galvanic materials toward electric current collectors so that electrons can be transferred to/from the external electric circuit at higher current densities than would otherwise be possible. High-surface-area carbon particles can support a great many galvanic particles that, by themselves, may or may not react immediately upon contact with a current collector surface. Most of these particles are not good conductors in both charged and discharged states; so, momentary contact by a naked particle may not allow sufficient time to complete electron transfer and ion release. Carbon will immediately absorb an abundance of electrons or holes upon contact while emulating a supercapacitor. Galvanic particles affixed to carbon particles have time in their charged or discharged states to deliver or acquire energy and to reach equilibrium after the carbon particles contact the metal current collectors. This feature, along with the unprecedented speed that these decorated particles contact electrode surfaces in TVF electrochemical cells, contributes to the cell's high current density.

Fuel cells operate for discharging current in the same matter as batteries; but, acquire energy differently. For a fuel cell acquiring energy from a fuel, carbon particles decorated with catalyst can react with the fuel and oxidizer while in suspension because the carbon again acts as a buffer to store energy. In fact, such a suspension is a better environment for the chemical reaction than any prior art electrode structures. Those particles can then deliver the energy to an external circuit just as described for a battery.

Because the charged particles are accelerated, there is no need for the electric current collectors or electrolyte flow channels to have small diameters in order to achieve high currents.

It is therefore a first advantage of the present invention to provide an improvement over earlier galvanic cells by providing new galvanic cells incorporating high-molar, non-Newtonian electrolytes.

A second advantage of this invention is to provide galvanic cells that incorporate TVF for use with high-molar galvanic, non-Newtonian electrolytes.

A third advantage of this invention is to provide galvanic cells that incorporate both TVF and CCF for use with high-molar galvanic, non-Newtonian electrolytes.

A fourth advantage of this invention is to provide high-molar galvanic, non-Newtonian electrolytes for use in galvanic cells.

A fifth advantage of this invention is to provide high-molar galvanic, non-Newtonian electrolytes containing carbon particles decorated with galvanic material flakes for use in galvanic cells These advantages are more fully set forth in the following descriptions of preferred embodiments of this invention.

BRIEF DESCRIPTIONS OF THE SEVERAL VIEWS OF THE DRAWINGS

FIG. 1B is a magnified view of a portion of FIG. 1A showing a portion of the battery's electrodes.

FIG. 2A, FIG. 2B, FIG. 2C and FIG. 2D are detailed illustrations of Taylor Vortex Flows and Circular Couette Flows in galvanic cells of this invention.

FIG. 6 is a fragmentary view of a cross section of third embodiment of this invention configured as a fuel cell.

DETAILED DESCRIPTION OF THE INVENTION

First Embodiment

Metal Hydride or Li-Ion Self Contained Battery

The Cell

Figure 1A:
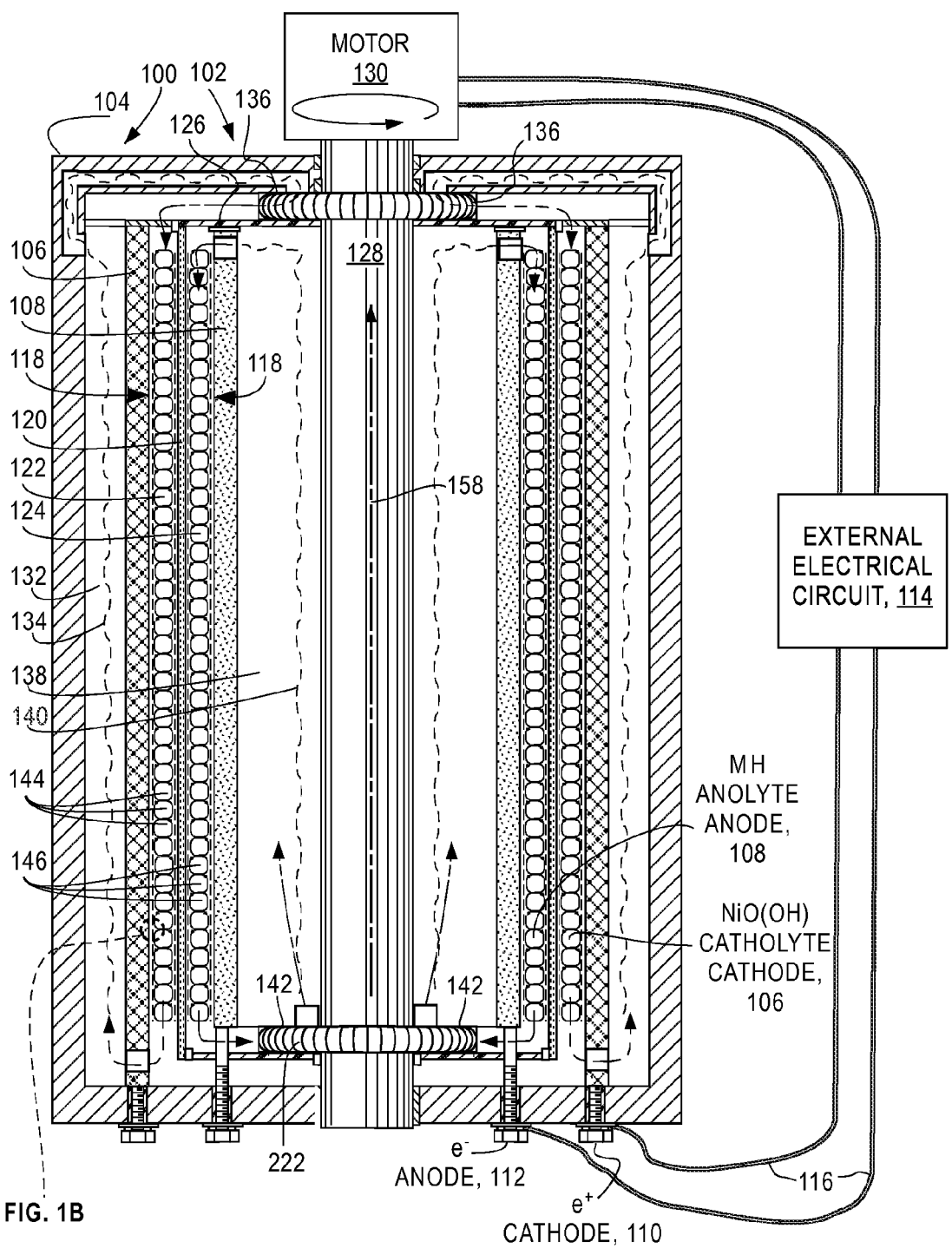
FIG. 1A is a fragmentary view of a cross section of a first embodiment of this invention configured as a faradaic battery.

FIG. 1A and FIG. 1B are a cross-sectional views of essential features of a preferred embodiment of an electrochemical cell 100 of this invention configured as a metal hydride battery 102. The battery 102 comprises a case 104 containing an outer current collector 106 and an inner current collector 108 that are fixed to the case 104 and connected by positive terminal 110 (battery CATHODE) and negative terminal 112 (battery ANODE), respectively, to external electrical circuit 114 by conductors 116. In this embodiment, the current collectors 106, 108 are coaxial right-circular cylinders; however, these attributes are not a requirement and other cylinder-like geometries (e.g. elliptical, conical, hyperbolic, irregular, different axes) may be employed so long as the surfaces do not come in contact with each other.

A gap 118 between the current collectors 106 and 108 is divided by filter 120 into an outer electrolyte chamber 122 and an inner electrolyte chamber 124. The filter 120 in this embodiment is also a right-circular cylinder that is coaxial with the current collectors 106, 108; however, the filter 120 may be cylinder-like and it need only be approximately coaxial with the current collectors 106, 108.

Unlike the current collectors 106, 108 that are fixed to the case 104, the filter 120 is journaled for rotation within the gap 118 between the current collectors 106, 108. The top of the filter 120 is secured to hub 126 that is fixed to the axle 128 of motor 130.

The outer electrolyte chamber 122 is filled with a first electrolyte that here is called catholyte. Similarly, the inner electrolyte chamber 124 is filled with a second electrolyte that here is called an anolyte. In another embodiment, the first electrolyte could be the anolyte and the second electrolyte could be the catholyte—with appropriate changes in the polarities of the terminals 110, 112. Details of electrolyte embodiments will be described below.

The catholyte circulates through a recirculation chamber 132—as shown by wavy dashed line 134. Optional pump 136 can be incorporated to accelerate catholyte flow. Similarly, the anolyte circulates through a recirculation chamber 138—as shown by the wavy dashed line 140. Optional pump 142 can be incorporated to accelerate anolyte flow. The recirculation chambers 132, 138 can be made larger than the electrolyte chambers 122, 124 to provide reservoirs of large volumes of catholyte and anolyte.

The filter 120 serves two principal functions. First, it prevents catholyte and anolyte particles from intermingling or crossing through the filter—as will be explained further below. Second, the filter 120 rotates between the outer electrolyte chamber 122 and the inner electrolyte chamber 124 to generate outer electrolyte chamber 122 TVF 144 and inner electrolyte chamber 124 TVF 146. FIG. 1B is a magnified view of a portion of FIG. 1A showing a portion of the battery's outer electrolyte chamber 122; the outer current collector 106 and TVF 144. Also shown is outer electrolyte chamber 122 CCF 148.

The battery cell 102 is operated to produce electricity for transmission to the external electrical circuit 114 by a process comprising:
1. Filling the outer electrolyte chamber 122 with catholyte;
2. Filling the inner electrolyte chamber 124 with anolyte; and
3. Rotating the filter 120 at a rate of rotation adequate to cause—
   a. TVF 144 to form in the outer electrolyte chamber 122 catholyte, and
   b. TVF 146 to form in the inner electrolyte chamber 124 anolyte, Additionally, the optional catholyte pump 136 and the optional anolyte pump 142 pump may be operated to provide additional axial flow through the outer electrolyte chamber 122 and inner electrolyte chamber 124, respectively.

Figure 2D:
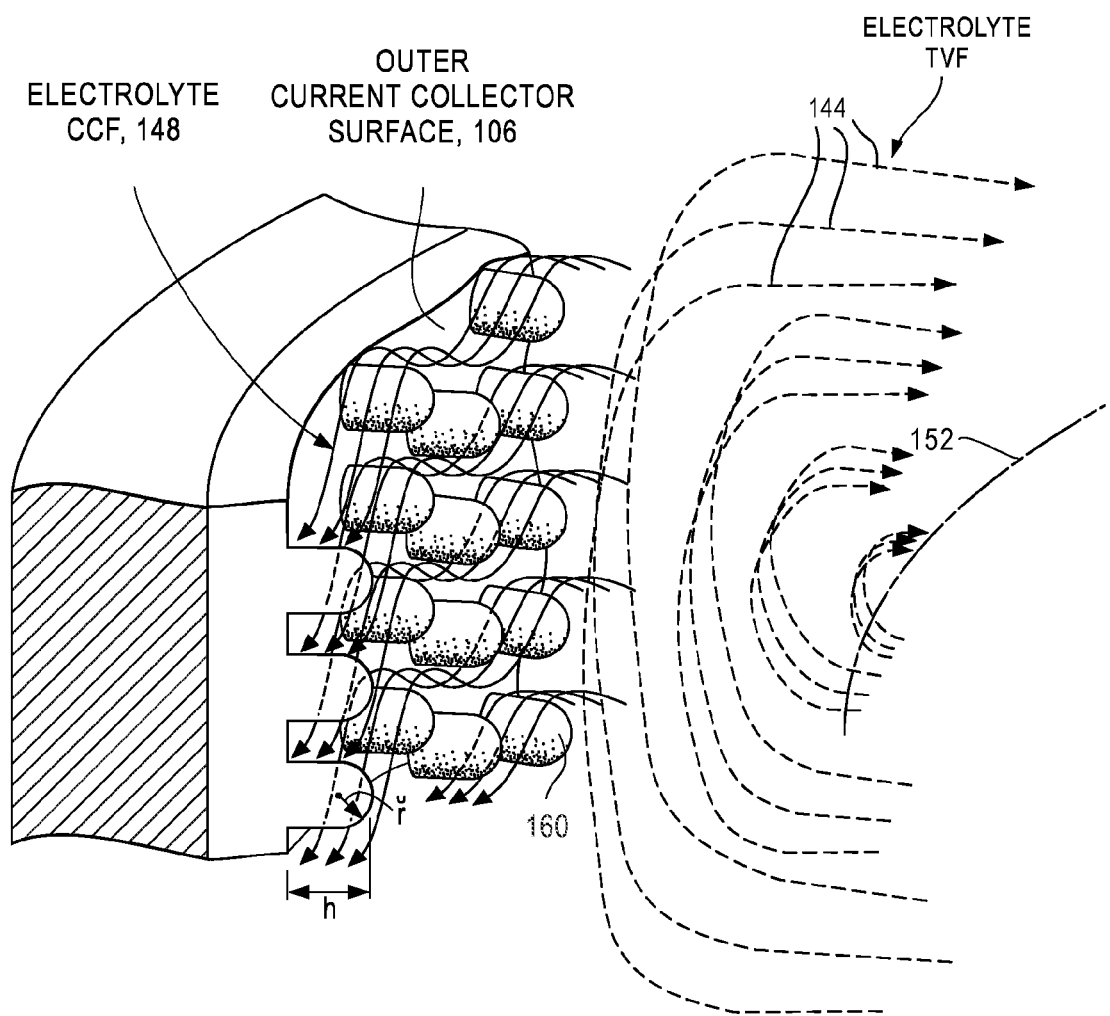

FIG. 2A, FIG. 2B, FIG. 2C and FIG. 2D are more detailed and somewhat idealized illustrations of TVF 144 in the outer electrolyte chamber 122. The vortex flows 144 resemble doughnuts or, more technically, tori of fluid that spin around their own axes 152. These tori 144 spin axes 152 define planes that are perpendicular to the cross-section view plane of FIG. 2C. FIG. 2D shows a torus 144 spin axis 152 in perspective. Vortex radii 154 extend from the outer electrolyte chamber 122 center 156 to the cell's spin axis 158 (also shown in FIG. 1A) between the stationary outer current collector 106 and spinning filter 120.

As shown in FIG. 2B, several vortices 144 form an array that extends along the full axial length of the outer electrolyte chamber 122. Each vortex 144 is contra-rotating with respect to its adjacent vortex 144. Diameters of vortexes 144 are slightly less than the width 118 of the electrolyte chamber 122 in order to accommodate the CCF 148 (not shown in FIG. 2B).

Of critical importance to the invention is the fact that the entire array of vortices 144 is enveloped by a high-shear-rate laminar boundary layer 148 (FIG. 2C and FIG. 2D) of spinning fluid forming the CCF 148, 150 that almost fully cover each surface that encloses the array of vortices 144. The CCF 148, 150 thin layers of fluid are moving with high laminar shear perpendicularly to the sectional plane of FIG. 2C. FIG. 2D provides a perspective view of the relationship between the CCF 148 and the TVF 144 rotating around the TVF axis 152. The CCF 148 are orthogonal to the TVF 144 and parallel to the TVF axis 152. The CCF 148 encompass protuberances 160 (FIG. 2D) that extend from the current collector 106 surface layer into the CCF 148. A similar relationship is formed at the filter 120 surface (not shown in FIG. 2D).

Referring to FIG. 2C, the CCF 148 adjacent the rotating filter 120 surface move most rapidly near the filter 120 surface and least rapidly where CCF 148 transition to TVF 144 at 162, which is a small distance from the filter 120 surface. Conversely, the CCF 148 are nearly static adjacent the stationary outer current collector 106 and move most rapidly where the CCF transition to TVF 144 at 164, which is a small distance from the outer current collector 106 surface.

The high velocity differences of these laminar boundary layer CCF 148, 150 and the very small distances over which they occur produce extremely high shear rates and consequently large mass transport coefficients. The invention takes further advantage of this very desirable condition by incorporating the protuberances 160 that extend into the high-shear laminar-flow streams 148 shown in FIG. 2C and FIG. 2D and disclosed in Case A, Case C, Case D and Case E. This greatly increases the amount of surface exposed to the high shear flow.

An important feature of the TVF is illustrated in FIG. 2C where particles 166 and bubbles 168 are captured by TVF 144 and swirl around the TVF tori axes of rotation 152. The particles 166 are part of the anolyte and catholyte to be described later. The particles 166 and bubbles 168 are not in actual solution as part of the electrolyte and are therefore subject to the flow dynamics just described. They will experience high pressure gradients caused by the fluid electrolyte TVF 144. These high gradients appear in both the high-shear laminar CCF 148 and within the vortices 144. They quickly drive the particles 166 and bubbles 168 toward the centers of the nearest vortices 144. There, in high concentration suspensions (e.g., Chiang et al, "semi-solid mixture") the particles 166 will collide with each other and be accelerated toward the current collector 108 and the filter 120—as will be described later. The same mechanics occur in the inner electrode chamber 124.

The Electrolyte

The electrolytes taught by Chiang et al and Duduta et al comprise suspensions or slurries of a mixture of faradaic particles and carbon particles in an organic or aqueous liquid that forms a non-Newtonian fluid. As described above, faradaic reactions proceed predominantly along paths that have electron or hole charges on the faradaic particles transferred from/to metal electrode surfaces or through the carbon particles in simultaneous contact with the current collectors. If the transfer occurs through the carbon particles, a two-step procedure is required that wastes both time and energy and lowers the cell's current capacity.

Figure 3:
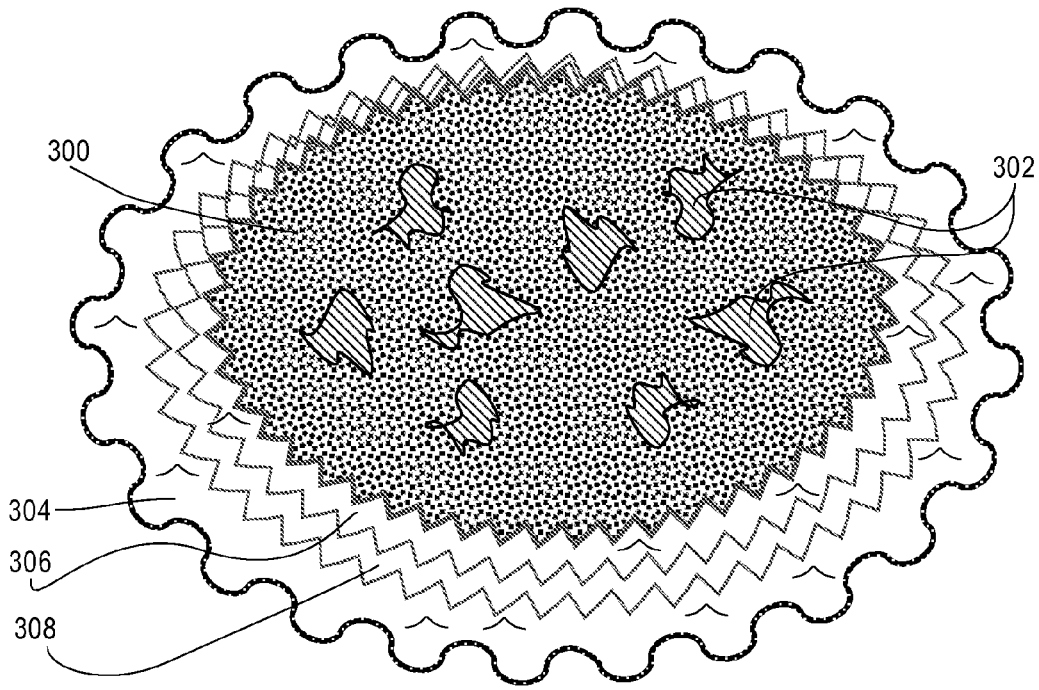
FIG. 3 is an illustration of a carbon particle decorated with faradaic flakes suspended in electrolyte and surrounded by a hydrophilic meniscus.

Electrolytes of this invention are different from those taught by Chiang et al and Duduta et al. FIG. 3 illustrates a carbon particle 300 decorated with faradaic flakes 302 suspended in electrolyte and surrounded by a hydrophilic meniscus 304 of electrolyte. KETJENBLACK®, VULCAN®, ELFTEX® carbon balls are suitable. FIG. 3 shows only eight flakes 302; however, in reality the flakes 302 number in the hundreds of thousands to the tens of millions—and more—on each particle 300.

The faradaic flakes 302 are affixed to the surfaces of the carbon particles 300 by processes such as electrodeposition, electrostatic adsorption, vacuum deposition or sputtering so that the faradaic flakes 302 are secure and in good electrical conductivity with the carbon particles 300. Therefore, there is no need for a free-floating faradaic flake to contact a free-floating carbon particle, as taught by Chiang et al and Duduta et al, before a charge can be transferred.

The carbon particles 300 measuring from as small as 50 nm to as large as 5 μm in diameter and have large, rough surfaces on the order of 1,400 meters$^2$ per gram. Each of the carbon particles 300 can support millions of thin, 10-200 Å faradaic flakes 302 so that distribution of the faradaic flake 302 mass can be optimized for increasing faradaic exposed surface area while reducing cost. Further, the decorated carbon particles 300 can be relatively large—1 to 125 μm in enclosing diameter—so that they cannot pass through the inexpensive, rugged filter 120 and cross-contaminate particles in the opposite electrolyte chamber 122, 124.

The particle is also surrounded by an Inner Helmholtz Plane (IHP) 306 and an Outer Helmholtz Plane (OHP) 308 formed in the electrolyte at or near its meniscus 304. The IHP 306 and the OHP 308 support an electronic double layer (EDL) supercapacitor that provides the cell with surge energy capacity as now described for discharge at a cathode. It is noted that the reverse or charging process of increasing the energy level of the faradaic material for a battery can only occur while the particle is in electrical contact with the electrode supplying current from the charging circuit. That is not the case for a fuel cell embodiment of this invention where fuel and oxygen can charge suspended particles in their respective anolyte and catholyte compartments.

In a typical battery cathode discharge process, an electron can be transferred to one of the catholyte flakes 302 containing many participating molecules that previously have been raised to their charged states from their supporting carbon particle 300 while the carbon particle 300 is in suspension. The electron leaves a hole in the carbon particle 300, represented by the $2s^22p^1$ vacancy state. The catholyte flake is neutralized by absorbing a cation, such as a proton or Li$^+$. The composite particle 300 is now positively charged and the particle's charge is multiplied because there are very many faradaic flakes 302 on a single carbon particle 300.

At the same time and using aqueous chemistry as an example, excess (OH)$^-$ is drawn from electrolyte 304 and attached to the carbon particle 300 positively charged surface to form an IHP 306 EDL interface. A positive ion (e.g., K$^+$) in the electrolyte meniscus 304 is drawn to the excess (OH)$^-$ surface charge to define an OHP 308 and charge gradient extending a short distance into the neutral bulk solvent electrolyte. The IHP 306 and OHP 308 pathways are on the order of 1 or 2 nm; so, transitions are very fast—as in a supercapacitor. The super-capacitive positive charge of the carbon particle 300 is capable of absorbing a very large (surge) electron flow from contact with the cathode metal current collector if the external circuit demands the current. At the same time the large reservoir of (OH)$^-$ ion is released from the OHP 308 to travel quickly on TVF to the filter where it combines with an ion of opposite polarity. Since there are very many decorated carbon particles 300 with very large surfaces, the large volume of IHP 306/OHP 308 dischargeable EDL form an enormous reservoir of energy to meet transient surge demands.

Catholytes and anolytes for use in this invention are prepared by blending decorated carbon balls with the same electrolyte. Because such a particle retains good electrical conduction in both the charged and discharged state, it can exchange electrons and ions very quickly during momentary direct contact with the metal current collector surfaces. However, an exchanged ion must also either cross (lithium chemistry) the filter boundary between catholyte and anolyte or neutralize its opposite ion (aqueous chemistry) at or within the filter boundary. As explained above, high-shear-rate, CCF-accelerated TVF ion transport and exchange across the filter boundary is the only ion mass transport process capable of electrical surge demand and high-rate ion release at the current collector surfaces. Ion exchange across the filter boundary is not a rate-limiting process for this invention; provided, there is a concentration gradient on opposite sides of the filter. That is because the liquid component of the electrolyte is free to move in either direction through the filter.

Metal or meta-oxide flakes decorate the high surface area carbon balls. However, when the composite particles come into contact with the charging or discharging metal electrode surfaces, it is the flakes that immediately exchange protons or Li$^+$ cations with the electrolyte while carbon surfaces exchange electrons with the metal electrodes.

Charging the composite particle (whether chemically as in a fuel cell or by contact with an electrode surface as in a conventional battery) creates an excess of solvent counter ion within and slightly beyond the OHP on the high-surface-area carbon balls. Pure metals exchange (OH)$^-$ anions. A generalized faradaic or catalyst particle decorating a carbon surface creates the exchange; but, carbon holds the excess electron or hole. Until the counter-ion is released at the electrode surface, it remains tightly bound to the carbon IHP. This creates a concentration gradient of ions surrounding carbon surfaces that have not yet discharged at current collector surfaces. The bound counter-ions exist in a bath of released excess exchange ions (e.g., Li$^+$, K$^+$, [OH]$^-$) on both sides of the rotating filter and need to cross the filter (Li$^+$) or neutralize one another (K$^+$ and [OH]$^-$) within the filter. The counter-ion cloud that is bound to and extends somewhat into the diffusion layer covering the yet-to-be-discharged carbon ball surface pushes oppositely-charged, freely-dissolved exchange ions ahead of itself. Every time the ions impinge on the filter surface, as frequently and as rapidly as they do at the current collector surfaces, the counter-ions push the effectively increased concentration of exchange ions into or across the filter.

For example, a spontaneous change within a carbon-supported lithium flake from a charged to a discharged state causes anolyte to release Li$^+$ cations that will add electrons to the carbon (normally 2 electrons in the $2s^22p^4$ charged state). That reaction binds Li$^+$ to the carbon surface and releases a hexafluorophosphate (PF$_6$) counter-ion$^-$ within the OHP and into the diffusion layer to concentrate the free Li$^+$ surrounding the carbon ball. On the opposite side of the filter, there is a deficiency of Li$^+$ and it is the PF$_6^-$ that is most exposed.

When these particles contact either side of the filter, the particles establish both a charge gradient and a concentration gradient. Mobility of Li$^+$ provides selective cross-filter exchange of this cation and facilitates the transport of Li$^+$ from one electrolyte chamber to the other.

Water management in flow cells and fuel cells is a classic problem, especially for large systems. Water and particle volume changes tend to create large differential pressures between catholyte and anolyte chambers and cannot be relieved across conventional semi-permeable membranes (e.g., NAFION). Cycling between charge and recharge can reverse water volume accumulation for flow cells; but, not for fuel cells that operate only in the effective discharge direction. One side of the membrane will accumulate more volume while the other loses water. It is not sufficient to merely extract water from one side and add it to the other side without also adjusting pH. That would require additional storage of acid or alkali for the system. In TVF batteries of this invention, the volume adjustment is automatic across the particulate filter. If water is created on one side as it is consumed on the other, then the volume differential pushes full pH electrolyte through the filter to balance pressures. It does this because particles will not cross the liquid-permeable filter because of the combined forces of TVF and CCF.

Transferring Charge to Current Collectors

Figure 4:
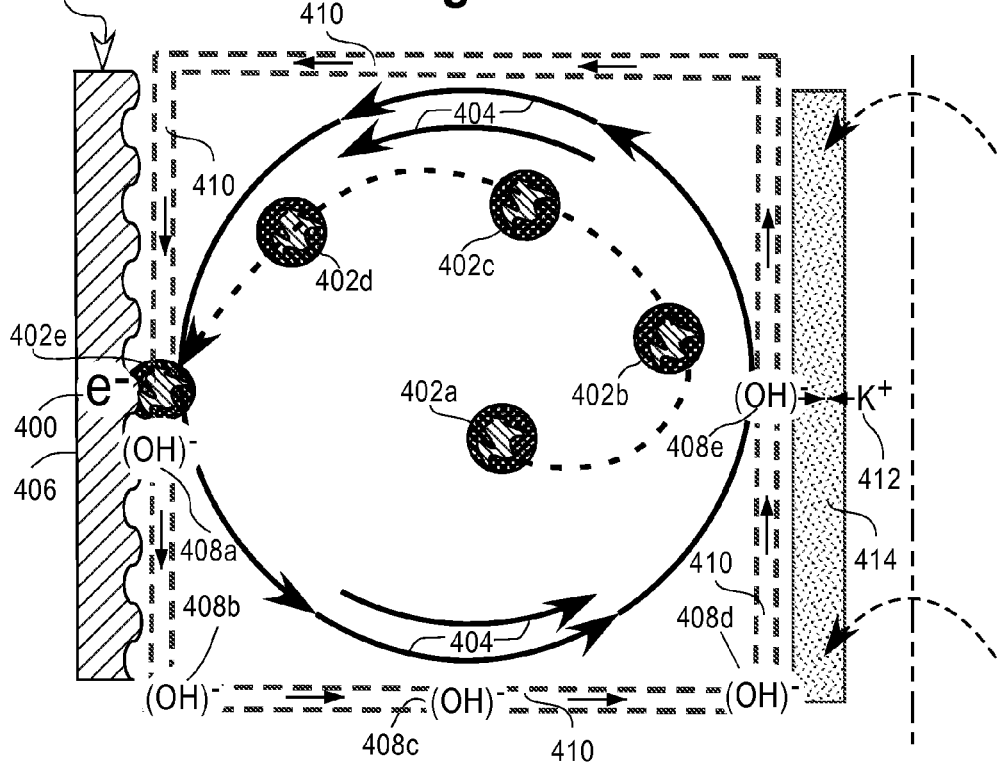
FIG. 4 is an illustration of how an electron is transferred from a decorated carbon particle in TVF to a current collector and how a hydroxyl anion is propelled by CCF toward a cation at a rotating filter.

FIG. 4 illustrates how an electron (e) 400 is first delivered to a decorated carbon particle 402 in TVF 404 as described in the example above and then replaced from metal cathode current collector 406 and how hydroxyl anion 408 is released and propelled by TVF 404 and CCF 410 toward a cation 412 (e.g., K$^+$) at rotating filter 414.

The decorated carbon particle 402 initially is trapped near the swirling center of TVF 404 at position 402a because its hydrodynamics are different from those of electrolyte. After the particle 402 collides with another similar particle (not shown) and acquires some of its kinetic energy, it is accelerated to position 402b where centrifugal force and the velocity of the TVF 404 accelerate it to positions 402c and 402d before it enters high-shear-rate CCF 410 and collides with the current collector 406. The particle's collision with the current collector 406 allows the electron 400 coming from an external electric circuit (not shown), to transfer from the current collector 406 to the particle 402.

The collision with the metal current collector also creates hydroxyl [(OH)$^-$] anion 408 at position 408a in CCF 410. The CCF 410 is orthogonal to the TVF 404, as shown in FIG. 2D. The anion 408 is then rapidly transported by the CCF 410 and the TVF 404 to positions 408b, 408c and 408d, before it reaches position 408e at rotating filter 414 and meets K$^+$ cation 412. The velocity of the anion 408 is very high—especially when compared with transport rates in conventional galvanic cells—and this is a major contribution to the cell's current rate. Anode electron transfer is the reverse of that described for the cathodic process and it is an anion (e.g., OH$^-$) released in the discharge process. Recharging with applied voltage to the positive cathode and negative anode terminals reverses both electron and ion flow direction.

The general Metal-Hydride MH chemistry may be expressed as follows:

Anode:

Cathode:

$$NiO(OH) + H_2O + e^- \leftrightharpoons Ni(OH)_2 + OH^-$$

The reaction sum is:

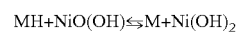

The M stands for a metal alloy that easily harbors and releases protons as some of the metal changes valence to offset charge transfer.

There is no net water volume increase in the reaction; but, there can be a movement of liquid volume from one electrolyte chamber to the other. Water movement assists ion exchange across the filter and has no effect on the total volume or alkali content of the system. That is a useful feature for a sealed battery.

La$_2$Ni$_5$ is an excellent proton storage material for the purpose and at the elevated temperatures tolerated by possible filter materials of this invention. MH and M particles both retain excellent electrical conductivity and may be used with or without carbon support. This chemistry stores exceptional energy/weight and produces no net water in either direction; so it is particularly suitable for a sealed secondary battery.

The Filter

The filter 414 is shown in FIGS. 1A, 1B and 4 as rotating to generate TVF and CCF; however, other embodiments may incorporate static filters and rotating current collectors. Use of a rotating filter with static current collectors has an advantage of not requiring slip rings and brushes to connect current collectors to external electrical circuits.

The filter 414 need only be a simple, low-cost mechanical filter that can keep decorated carbon particles 300, 402 in the anolyte and catholyte from crossing from their respective electrolyte chambers 122, 124 and cross-contaminating the other electrolyte. This feature is in contrast with conventional cells that require ion-selective semipermeable membranes (e.g., NAFION® or LISICON® membranes). Ion-permeable membranes are expensive, fragile and high-impedance. They also limit cell operating temperatures so that conventional cells usually require expensive faradaic or catalytic (e.g., Platinum Group metals) to promote galvanic reactions.

The filter 414 need not be ion selective or otherwise semi-permeable to retain decorated carbon particles 402 of micron dimensions within their respective electrolyte chambers 122, 124. About 1% of the carbon particles 300, 402 will be under-sized with little or no decoration. Some of these small particles and electrolyte 304 solvent may move in either direction through the filter 120, 414; but, the undecorated carbon balls 300, 402 and the solvent are common to both electrolyte 304 suspensions. The very few decorated carbon balls 300, 402 that migrate through the filter 120, 414 will not have a significant effect on cell performance.

TVF 144, 146, 404 will break any gaseous phase effluent into incompressible bubbles and hold them along the center axis of each counter-rotating vortex. Bubble size and surface tension render them virtually incompressible so the fluid, in general, retains an incompressible property.

In a thick suspension such as the proposed thixotropic electrolyte mixtures, viscosity is high; but, decreases with increasing shear rate. In thixotropic mixtures of electrolyte and galvanic material, particles will form what is often termed a polarization layer in the CCF adjacent all exposed surfaces. The layer comprises loose, unbound layers of small, undecorated particles with hydraulic properties similar to those of a fluidized bed. One very valuable property of CCF 410 when particle density exceeds 50% is rapid and continuous exchange of particles between the polarization layers in electrical contact with metal electrodes or the spinning filter where ions and charges are released and neutralized (e.g., positions 402e and 408e) and the bulk vortex where they are formed. Bubbles 168 do not behave in this way as buoyancy and shear flow in the vortex both operate to drive the bubbles toward the TVF center.

The carbon particles 300, 402 resist the shear pressure with a centripetal force of rotation about the vortex center. By contrast, the dissolved ions are carried by vortices between facing surfaces of the electrolyte chambers. In binary aqueous redox chemistry, oppositely charged ions are created respectively, mainly and simultaneously at the two current collector surfaces and mutually neutralized at or within the filter between as explained further below. Only Li-ion redox chemistry requires transport of the $Li^+$ ions across the filter. That is assisted by carbon supported anolyte and catholyte particles reacting with $Li^+$ in the TVF to establish a strong ion concentration gradient across the filter. Also the liquid component of electrolyte can move back and forth across the filter without exchanging particles because of the powerful filtration properties of TVF and CCF.

The filter 120, 414 is a key component of the system. It must have sufficient structural strength to hold its cylindrical shape under rapid (1,000 to 10,000 RPM) axial rotation. Porosity is much less critical as compared cells incorporating ion-exchange membranes because the high laminar shear rate within surface-adjacent CCF 148, 150, 410 effectively prevents particle cross-over. It is extremely important that the filter 120, 414 be dielectric or the two electrolyte chambers 122, 124 will short circuit. Any conductor in contact with one electrolyte must be insulated from the other. If a metal screen is used as a filter structural support, then it must be well coated with stable insulation. Ceramic sintering on stainless steel mesh is an example. A variety of porous materials can be supported on such a structure. Many types of porous ceramic are available as well.

Other Features

All these properties, taken together, support an electrochemical architecture that will work in secondary batteries, flow cells and fuel cells, as disclosed here. One practical key to implementation of the invention is CCF 148, 150 at the current collector surfaces comprising protuberances 160 (FIGS. 1B and 2D) filled with a matted network of small, undecorated carbon particles that will form automatically from the suspension. In order to promote and maximize this effect, the metal current collector surfaces 106, 108 are roughened to form protuberances similar to those previously described in Case A through Case E. They could include sharp edges, corners and burrs to promote mat formation. The protuberances should extend well into the CCF 148, 150, 410 and perhaps, a bit further into the TVF-CCF interface. The protuberances are not fragile and cannot be damaged by powerful vortices.

The size of the gap 118 (FIGS. 1A & 2C) between each of the current collectors 106, 108, 406 and the filter 120, 414 and consequent vortex diameter is intended to be large so that the volume of catholyte and anolyte in the electrolyte chambers holds a large amount of faradaic material. While the narrow-gap electrolyte chambers taught by Chiang et al and by Duduta et al is not appropriate for cells of this invention, there is a tradeoff between the electrolyte chamber 122, 124 volume or energy content and rotation speed that affects processing rate and power.

As the decorated particles 300, 402 move into the CCF 148, 150, 410 and contact carbon filament matted between protuberances 160, the decorated particles 302, 402 discharge and move away in favor of another decorated carbon particle 302, 402 coming from the TVF 144, 146, 404. This is a very rapid process and can support very high current density and power. It is a CCF 148, 150, 410 super-fast processing reaction zone at the current collector 106, 108, 406 surfaces, with faradaic or free carbon particles rapidly moving into it, becoming quickly processed and then rapidly leaving. The CCF 148, 150, 410 will have a thickness of about 4 to 5% of the gap 118 between each of the current collectors 106, 108, 406 and the filter 120, 414.

The electrochemical process produces size and volume changes in the decorated particles 300, 402, electrolyte volume changes in each of the electrolyte chambers 122, 124, in some chemistries and in the system as a whole as water is produced and/or consumed during charge and recharge cycles. This will cause some electrolyte solvent to move across the filter 120, 414 from one electrolyte chamber 122, 124 to the other electrolyte chamber 122, 124. Under laminar TVF/CCF conditions, the decorated carbon particles 300, 402 remain in their respective electrolyte chambers 122, 124 as small amounts of electrolyte move back and forth across the rotating filter 120, 414. If volume of the entire fluid system changes, then a volume accumulator is required in a closed sealed secondary battery. Rotation of the filter 120, 414 sets up powerful centrifugal forces on fluid within the pores of the filter. Therefore, ion exchange through the rotating filter 120, 414 can be accelerated by vibration of its mass. These vibrations can be induced as a component of rotation (e.g., bearing runout, imbalance) and will establish eddies within the pores of the filter 120, 414 due to instabilities of forces within the fluid. Eddies increase the rate of ion exchange from one surface to the opposite side of the filter 120, 414 with or without net fluid flow across the filter 120, 414.

Chiang et al and Duduta et al teach cells with a need for external tanks to hold catholyte and anolyte. These external tanks are necessary for their cells because their electrolyte chambers must have small diameters in order to minimize distances traveled by their weakly-driven carbon particles to current collectors. Therefore, the volumes of anolyte and catholyte in the electrolyte chambers must be small.

By contrast, batteries of this invention can be a fully self-contained and enclosed in sealed containers containing faradaic particle suspensions holding a substantial charge of energy without any external storage because they can have relatively large electrolyte chambers. External storage tanks may be used as an option; but, they are not always required.

Second Embodiment

Flow Cells

The Cell

Figure 5:
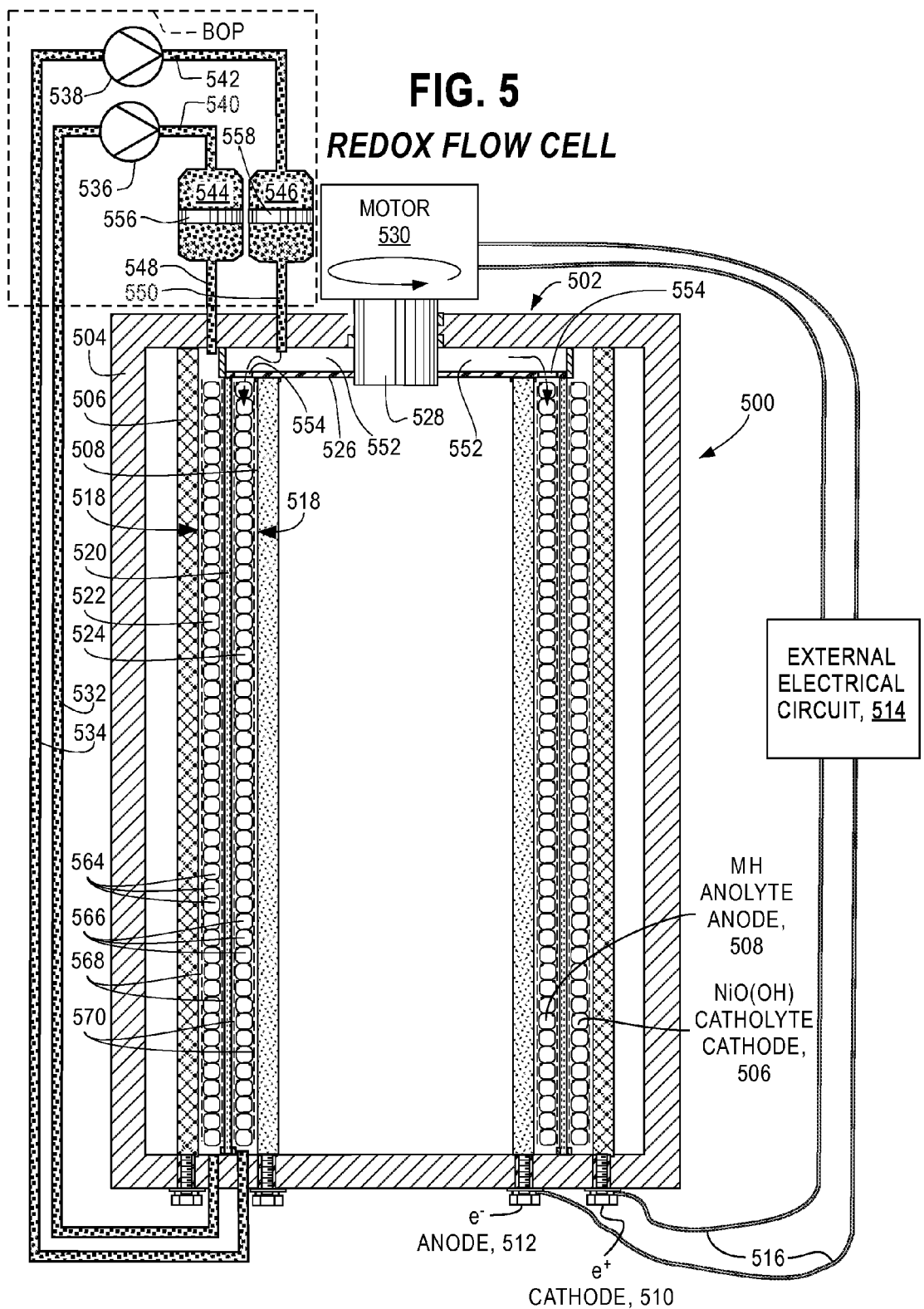
FIG. 5 is a fragmentary view of a cross section of a second embodiment of this invention configured as a redox flow cell.

FIG. 5 is a cross-sectional view of essential features of a preferred embodiment of an electrochemical cell 500 of this invention configured as a redox flow cell 502. The flow cell 502 comprises a case 504 containing an outer current collector 506 and an inner current collector 508 that are fixed to the case 504 and connected by positive terminal 510 (battery CATHODE) and negative terminal 512 (battery ANODE), respectively, to external electrical circuit 514 by conductors 516. In this embodiment, the current collectors 506, 508 are coaxial right-circular cylinders; however, these attributes are not a requirement and other cylinder-like geometries (e.g. elliptical, conical, hyperbolic, irregular, different axes) may be employed so long as the surfaces do not come in contact with each other.

A gap 518 between the current collectors 506 and 508 is divided by filter 520 into an outer electrolyte chamber 522 and an inner electrolyte chamber 524. The filter 520 is also a right-circular cylinder that is coaxial with the current collectors 506, 508; however, the filter 520 may be cylinder-like and it need only be approximately coaxial with the current collectors 506, 508.

Unlike the current collectors 506, 508 that are fixed to the case 504, the filter 520 is journaled for rotation within the gap 518 between the current collectors 506, 508. The top of the filter 520 is secured to hub 526 that is fixed to the axle 528 of motor 530.

The outer electrolyte chamber 522 is filled with a first electrolyte that here is called catholyte. Similarly, the inner electrolyte chamber 524 is filled with a second electrolyte that here is called an anolyte. In another embodiment, the first electrolyte could be the anolyte and the second electrolyte could be the catholyte—with appropriate changes in the polarities of the terminals 510, 512. Details of electrolyte embodiments will be described below.

The catholyte circulates through a catholyte recirculation pipe 532. Similarly, the anolyte circulates through an anolyte recirculation pipe 534. The catholyte recirculation pipe 532 and the anolyte recirculation pipe 534 are connected to respective inputs of a catholyte pump 536 and an anolyte pump 538.

Catholyte pump 536 output 540 and anolyte pump 538 output 542 feed catholyte storage tank 544 and anolyte storage tank 546, respectively. Catholyte from the catholyte storage tank 544 output 548 is pumped into the outer electrolyte chamber 522. Anolyte from the anolyte storage tank 546 output 550 passes into the inner electrolyte chamber 524 duct 552 and then through holes 554 in the hub 526.

The pumps 536, 538 and the storage tanks 544, 546 are part of the Balance of Plant BOP. The BOP is energized by an external electrical circuit (not shown) that powers the pumps 536, 538 and heaters (not shown) in the storage tanks 544, 546. The external electrical circuit also provides energy for recharging the spent catholyte and anolyte.

While the MH—NiOOH chemistry described above for the sealed secondary battery 102 works in flow cells, Li-ion chemistry works better. All polarity conventions remain the same so that references to catholyte, anolyte, charge and ion transfer will follow similar descriptions.

An example of a preferred catholyte is ordered $LiNi_{0.5}Mn_{1.5}O_4$ spinels having particle sizes in the range of 3 to 5 microns taught by Ma et al, High Rate Micron-Sized Ordered $LiNi_{0.5}Mn_{1.5}O_4$, J. Of the Electrochemical Society, No. 157(8) (c)2010, pp. A925-A931. These may be carbon supported or freely suspended particles in limited power applications because they retain good surface electrical conductivity and ion release for both charge and discharge cycles. Possible anolytes are carbon intercalated with lithium metal or carbon decorated with $LiCoO_2$ or $Li_4Ti_5O_{12}$. The latter is preferred because it has a higher potential (1.55 volts compared to 0.8 for the others) relative to $Li/Li^+$ This can prevent SEI (solid electrode interphase) recharge deposits that may suppress discharge activity.

Electrolyte suspensions may comprise organic solvents such as alkyl or ethylene and diethyl carbonates. These suspension may contain lithium salts, typically, lithium hexafluorophosphate ($LiPF_6$), to provide an abundant supply of $Li^-$ cations in solution. Solid metal current collectors may be aluminum for the cathode outer current collector 506 and copper for the anode inner current collector 508.

As described for the battery 102, the filter 520 serves two principal functions. First, it separates the catholyte from the anolyte—as has been explained. Second, the filter 520 rotates between the outer electrolyte chamber 522 and the inner electrolyte chamber 524 to generate outer electrolyte chamber 522 TVF 564 and inner electrolyte chamber 524 TVF 566. Also shown in FIG. 5 are outer electrolyte chamber 522 CCF 568 and inner electrolyte chamber 524 CCF 570.

The redox flow cell 502 is operated to produce electricity for transmission to the external electrical circuit 514 by a process comprising:
1. Filling the outer electrolyte chamber 522 with catholyte;
2. Filling the inner electrolyte chamber 524 with anolyte;
3. Energizing the pumps 536 and 538 to pump catholyte and anolyte against catholyte storage tank piston 556 and anolyte storage tank piston 558, respectively, in order to force catholyte and anolyte, respectively, through tank outputs 548 and 550 into the outer electrolyte chamber 522 and inner electrolyte chamber 524 anolyte, respectively;
4. Rotating the filter 520 at a rate or rotation adequate to cause—
   a. TVF 564 to form in the outer electrolyte chamber 522 catholyte, and
   b. TVF 566 to form in the inner electrolyte chamber 524 anolyte.

The Electrolyte

The electrolytes described for use in the battery 102 can also be used in the flow cell 502. Their descriptions are incorporated here by reference.

Until the exchanged ion is released at the current collector 106, 108, 406, 506, 508 surface, the ion remains tightly bound to the carbon IHP 306. This creates a concentration gradient of the counter-ions surrounding carbon particles 300, 402 that have not yet discharged at current collector 106, 108, 406, 506, 508 surfaces. The counter-ions exist in a bath of released excess exchange ions (e.g., $Li^+$, $K^+$, $[OH]^-$) on both sides of the rotating filter 120, 414, 520 and need to cross the filter ($Li^+$) or neutralize one another ($K^+$ and $[OH]^-$) within the filter 120, 520. The counter-ion cloud that is bound to and extends somewhat into a diffusion layer covering the yet-to-be-discharged carbon particle 300, 402 surface pushes oppositely-charged, freely-dissolved exchange ions ahead of itself. Every time the ions impinge on the filter 120, 414, 520 surface, as frequently and as rapidly as they do at the current collector 106, 108, 406, 506, 508 surfaces, the counter-ions push the effectively increased concentration of exchange ions into or across the filter 120, 414, 520.

For lithium chemistry in this example, a spontaneous change within a carbon-supported lithium flake from a charged to a discharged state causes anolyte to release $Li^+$ cations that will add electrons to the carbon (normally 2 electrons in the $2s^22p^4$ charged state). That reaction binds $Li^+$ to the carbon particle 300, 402 surface and releases a hexafluorophosphate ($PF_6$) counter-ion$^-$ within the OHP 308 and into the diffusion layer to concentrate the free $Li^+$ surrounding the carbon particle. On the opposite side of the filter 120, 414, 520, there is a deficiency of $Li^+$ and it is the $PF_6^-$ that is most exposed. When these particles 300, 402 contact either side of the filter 120, 414, 520, the particles 300, 402 establish both a charge gradient and a concentration gradient. Mobility of $Li^+$ provides selective cross-filter exchange of this cation and facilitates the transport of $Li^+$ from one electrolyte chamber to the other.

Water management in prior art batteries, flow cells and fuel cells is a classic problem, especially for large systems. Water and particle volume changes tend to create large differential pressures between catholyte and anolyte chambers and cannot be relieved across conventional semi-permeable membranes (e.g., NAFION).

Cycling between charge and recharge can reverse water volume accumulation for flow cells; but, not for fuel cells that operate only in the effective discharge direction. One side of their membrane will accumulate more volume while the other loses water. It is not sufficient to merely extract water from one side and add it to the other side without also adjusting pH. That would require additional storage of acid or alkali for the system.

In flow cells and fuel cells of this invention, the volume adjustment is automatic across the particulate filter. If water is created on one side as it is consumed on the other, then the volume differential pushes full pH electrolyte through the filter to balance pressures. It does this because particles will not cross the electrolyte-permeable filter because of the combined forces of TVF and CCF. Pumps in a fuel or flow cell can operate to maintain equal volumes without concern for the direction or rate of fluid flow across the filter.

Finally, it should be noted that catholyte suspensions can be easily adapted to use air for oxidation in air breathing redox chemistry. The TVF and CCF architecture of galvanic electrochemical cells of this invention greatly simplifies using air because it can be injected into recirculating catholyte without suppressing any of the reactions described above. While all of the decorated carbon particles 300, 402 are energetically exposed to the air within TVF 144, 146, 404, 564, 566 vortices, the air itself remains sequestered at the centers of the vortices in the form of bubbles 168 that travel with the vortex in its axial trip toward an exit from the gap 118, 518 between the current collectors 106, 108, 406, 506, 508. Oxygen is converted to a soluble ion by carbon or catalysts attached to carbon particle 300, 402 surfaces. Nitrogen is expelled with the exiting vortex. When oxygen can be reduced in this way, well known, relevant chemistries follow.

Catholyte can be Li-spinel on carbon or merely high surface area carbon or $MnO_2$ as a catalyst on carbon; then $O_2$ will be reduced according to:

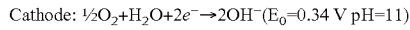
Cathode: $\frac{1}{2}O_2 + H_2O + 2e^- \rightarrow 2OH^-$ ($E_0 = 0.34$ V pH=11)

or:

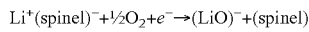
$Li^+(\text{spinel})^- + \frac{1}{2}O_2 + e^- \rightarrow (LiO)^- + (\text{spinel})$ The anolytes can be Li on carbon or Ti olivines or metals Na, Ca, Mg or Zn on carbon. These reactions are:

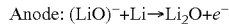
Anode: $(LiO)^- + Li \rightarrow Li_2O + e^-$ and typically for Zn;

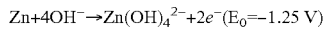
$Zn + 4OH^- \rightarrow Zn(OH)_4^{2-} + 2e^-$ ($E_0 = -1.25$ V)

that reduces to:

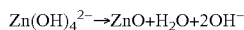
$Zn(OH)_4^{2-} \rightarrow ZnO + H_2O + 2OH^-$ in aqueous electrolyte.

The migrating filter-crossing ions are $(LiO)^-$ and $(OH)^-$ for aqueous discharge chemistry. The TVF cells can accommodate as much air as needed by saturating the catholyte carbon particles with oxygenated recirculating TVF. Of the several metal-air battery chemical couples shown in the table below, the Li-air battery is the most attractive because the cell discharge reaction between Li and oxygen to yield $Li_2O$, according to $4Li + O_2 \rightarrow 2Li_2O$, has an open-circuit voltage of 2.91 V and a theoretical specific energy of 5210 Wh/kg. Since oxygen is not stored in the battery, the theoretical specific energy excluding oxygen is 11,140 Wh/kg (40.1 MJ/kg). This compares favorably with 44 MJ/kg for gasoline. Gibbs=−268 kCal/mole, $E_o$=2.91 V.

Metal-Air Battery Couples

| Metal/air battery | Calculated open-circuit voltage, V | Theoretical specific energy, Wh/kg (including oxygen) | Theoretical specific energy, MJ/kg (including oxygen) | Theoretical specific energy, Wh/kg (excluding oxygen) |
|---|---|---|---|---|
| $Li/O_2$ | 2.91 | 5210 | 18.8 | 11140 |
| $Na/O_2$ | 1.94 | 1677 | 6.0 | 2260 |
| $Ca/O_2$ | 3.12 | 2990 | 10.8 | 4180 |
| $Mg/O_2$ | 2.93 | 2789 | 10.0 | 6462 |
| $Zn/O_2$ | 1.65 | 1090 | 3.9 | 1350 |

As will be described in conjunction with fuel cell of FIG. 6, it is practical to add perfluorodecalin (100 ml of $C_{10}F_{18}$ holds 49 ml of STP $O_2$) to a BOP system of catholyte circulation in order to concentrate oxygen in the carbon particle 300, 402 and electrolyte mixture as it is introduced into the catholyte reaction chamber.

The Filter

The filter 520 is similar to the filter 120 of the battery 102. is shown in FIGS. 1A & 1B as rotating to generate TVF 564, 566 and CCF 568, 570; however, other embodiments may incorporate static filters and rotating current collectors. Use of a rotating filter 520 with static current collectors 506, 508 has an advantage of not requiring slip rings and brushes to connect current collectors to external electrical circuits.

Other Features

As with the battery 102, one practical key to implementation of the invention is CCF 568, 570 at the current collector surfaces 506, 508 comprising protuberances 160 (FIGS. 1B and 2D) filled with a matted network of small, undecorated carbon particles that will form automatically from the suspension.

Third Embodiment

Fuel Cells

The Cell

FIG. 6 is a cross-sectional view of essential features of a preferred embodiment of an electrochemical cell 600 of this invention configured as a fuel flow cell 602. The fuel cell 602 comprises a case 604 containing an outer current collector 606 and an inner current collector 608 that are fixed to the case 604 and connected by positive terminal 610 (cell CATHODE) and negative terminal 612 (cell ANODE), respectively, to external electrical circuit 614 by conductors 616. In this embodiment, the current collectors 606, 608 are coaxial right-circular cylinders; however, these attributes are not a requirement and other cylinder-like geometries (e.g. elliptical, conical, hyperbolic, irregular, different axes) may be employed so long as the surfaces do not come in contact with each other.

A gap 618 between the current collectors 606 and 608 is divided by filter 620 into an outer electrolyte chamber 622 and an inner electrolyte chamber 624. The filter 620 is also a right-circular cylinder that is coaxial with the current collectors 606, 608; however, the filter 620 may be cylinder-like and it need only be approximately coaxial with the current collectors 606, 608.

Unlike the current collectors 606, 608 that are fixed to the case 604, the filter 620 is journaled for rotation within the gap 618 between the current collectors 606, 608. The top of the filter 620 is secured to hub 626 that is fixed to the axle 628 of motor 630.

The outer electrolyte chamber 622 is filled with a first electrolyte that here is called catholyte. Similarly, the inner electrolyte chamber 624 is filled with a second electrolyte that here is called an anolyte. In another embodiment, the first electrolyte could be the anolyte and the second electrolyte could be the catholyte—with appropriate changes in the polarities of the terminals 610, 612. Details of electrolyte embodiments will be described below.

The catholyte circulates through a catholyte recirculation pipe 632. Similarly, the anolyte circulates through an anolyte recirculation pipe 634. The catholyte recirculation pipe 632 and the anolyte recirculation pipe 634 are connected to respective inputs of a catholyte pump 636 and an anolyte pump 638.

Catholyte pump 636 output 640 and anolyte pump 638 output 642 feed catholyte storage tank 644 and anolyte storage tank 646, respectively. Catholyte from the catholyte storage tank 644 output 648 is pumped through oxygenator 650 into the outer electrolyte chamber 622. Anolyte from the anolyte storage tank 646 output 652 passes into the inner electrolyte chamber 624 duct 654 and then through holes 656 in the hub 626.

The pumps 636, 638, the storage tanks 644, 646 and the oxygenator 650 are part of the Balance of Plant BOP. The BOP is energized by an external electrical circuit (not shown) that powers the pumps 636, 638, the oxygenator 650 and heaters (not shown) in the storage tanks 644, 646.

As described for the battery 102 and the flow cell 502, the filter 620 serves two principal functions. First, it separates the catholyte from the anolyte—as has been explained. Second, the filter 620 rotates between the outer electrolyte chamber 622 and the inner electrolyte chamber 624 to generate outer electrolyte chamber 622 TVF 664 and inner electrolyte chamber 624 TVF 666. Also shown in FIG. 6 are outer electrolyte chamber 622 CCF 668 and inner electrolyte chamber 624 CCF 670.

The fuel cell 602 is operated to produce electricity for transmission to the external electrical circuit 614 by a process comprising:

1. Filling the outer electrolyte chamber 622 with catholyte;
2. Filling the inner electrolyte chamber 624 with anolyte;
3. Injecting FUEL into catholyte pump 638 for mixture with the catholyte;
4. Activating the oxygenator 650 to pump $O_2$ into the catholyte;
5. Energizing the pumps 636 and 638 to pump the catholyte-$O_2$ mixture and the anolyte-fuel mixture, respectively, in order to force catholyte and anolyte, respectively, through oxygenator 650 and anolyte tank output 648 into the outer electrolyte chamber 622 and inner electrolyte chamber 624 anolyte, respectively; and
6. Rotating the filter 620 at a rate or rotation adequate to cause—
   a. TVF 664 to form in the outer electrolyte chamber 522 catholyte-fuel mixture, and
   b. TVF 666 to form in the inner electrolyte chamber 524 anolyte-oxidizer mixture.

The Electrolyte

Electrolytes used in the fuel cell 602 fundamentally differ from those above described for use in the battery 102 and the flow cell 502, even though they may appear very similar. For example, NiOOH is a basic faradaic particle attached to carbon substrates used for many aqueous chemistries in the catholyte in battery 102 and the flow cell 502. In the fuel cell 602, NiOOH can be a very effective catalyst as the anolyte for oxidation of methanol. The only electrolyte-electrode mode of interest in a fuel cell is discharge. Charging in a fuel cell are chemical processes and these are described below as separate phenomena.

There are many possible catalysts; especially, the noble metals and their alloys. Their costs effectively limit their uses to very small amounts and discourage their use in high-power systems. Fuel cells of this invention can reach target power levels for virtually any application by using large amounts of nearly as effective catalyst costing less than 3-orders of magnitude less than noble metals. For example, the same battery carbon particles decorated with NiOOH can also be used for the catalyst in fuel cell anolyte. The molecule is very effective for the exchange of protons in a cycle that converts $CH_3OH$ (methanol) to $CO_2$; especially, at elevated temperature. NiOOH does this as a particle fully suspended in a saturated TVF solution of the electrolyte and methanol. This is one reason that fuel cells of this invention are simpler and more efficient than PEM and MEA fuel cells.

The methanol fuel cell chemical reactions are driven spontaneously by thermodynamics and proceed more or less directly as follows. Oxidation of $CH_3OH$ on a catalyst starts by adsorption of COH in a process known as dehydrogenation that produces $3H_{ads}$. The $3H_{ads}$ does not involve external exchange of electrons; but if the catalyst is 3NiOOH, then the catalyst can absorb the 3 protons and yield $3Ni(OH)_2$.

When NiOOH catalyst flake decorates a carbon particle, the next several alternate pathway steps in the process become possible before the whole particle contacts the current collector surface to discharge electrons. COH converts directly through CO and COOH to $CO_2$ by giving up 2 electrons in each step for a total transfer of 6 electrons to the carbon substrate. Small amounts of intermediate products are possible, including $CH_2O$ (formaldehyde) and HCOOH (formic acid) where both are as volatile as methanol and can be easily further oxidized to $CO_2$ in the overall process. The full process produces $5H_2O$ and consumes 6KOH to leave $6K^+$ ions attached to the carbon particle surface as an EDL attracted by the 6 electrons in the carbon. The $3Ni(OH)_2$ take the $3H^+$ back to return to 3NiOOH as a true catalyst should. The ease of shuttling the proton in and out of the molecule is what allows it to perform this function. The catalyst particle remains neutral but the carbon carries a highly charged EDL that can discharge when it contacts the anode metal current collector surface.

The process just described is slower than faradaic reactions. If the reaction had to complete only while the catalyst was in adequate electrical contact with the metal current collector in order to transfer electrons, it would probably not do so. Some stages could occur and perhaps the whole process could complete slowly through repeated collisions with the metal current collector; but, that would probably promote more intermediate product formation, especially CO, generate more heat and yield far less current. It is the novel use of catalyst decorating carbon particles in suspension that allows the reaction to go to completion using the carbon particles as effective electrode-electron sinks until charges can be released at the current collector. This reaction is simply not possible on fixed-electrode MEA surfaces for fully concentrated methanol or ethanol. The anolyte chamber volume divided by volumetric recirculation rate can provide sufficient residence time required to complete these reactions.

Air or oxygen is introduced into the catholyte chamber as previously described for the redox flow cell 502 or more appropriately and more fully described below using perfluorodecalin to support the oxygen reduction reaction (ORR). Multi-stage reactions also occur in the ORR cathode electrode to produce $(OH)^-$ ions that will neutralize the $K^+$ ions after the latter are released at the anode metal current collector surface. These ions meet at the filter 620. As methanol is consumed, the gas component will change from mostly $CH_3OH$ plus water vapor to $CO_2$ plus water vapor. $O_2+N_2+H_2O$ will change to $N_2+H_2O$, so both chambers will exhaust gas along with exiting electrolyte circulation.

The Filter

The filter 620 is similar to the filter 120 of the battery 102 and the filter 520 of the flow cell 502, as shown in FIGS. 1A, 1B, 4 and 5 as rotating to generate TVF 664, 666 and CCF 668, 670; however, other embodiments may incorporate static filters and rotating current collectors. Use of a rotating filter with static current collectors has an advantage of not requiring slip rings and brushes to connect current collectors to external electrical circuits.

Other Features

As with the battery 102 and the flow cell 502, one practical key to implementation of the invention is CCF at the current collector surfaces comprising protuberances 160 (FIGS. 1B and 2D) filled with a matted network of small, undecorated carbon particles that will form automatically from the suspension.

The Oxygenator

The TVF and CCF architecture of galvanic electrochemical cells of this invention greatly simplifies using air as an oxidizer. If air or $O_2$ is pumped into recirculating fuel or flow cell catholyte, which can be Li-spinel on carbon, just carbon or $MnO_2$ as a catalyst on carbon, then $O_2$ will be reduced according to:

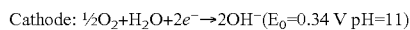
Cathode: $\frac{1}{2}O_2+H_2O+2e^-\rightarrow 2OH^-(E_0=0.34\text{ V pH}=11)$ or:

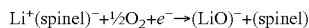
$Li^+(\text{spinel})^-+\frac{1}{2}O_2+e^-\rightarrow(LiO)^-+(\text{spinel})$ The migrating, filter-crossing ions are $(LiO)^-$, lithium and $(OH)^-$ for aqueous chemistry. The TVF cells can accommodate as much air as needed by saturating the catholyte carbon particles with oxygenated recirculating TVF. Normally, this can be accomplished by using porous carbon or $MnO_2$ flakes 302 on the carbon particles 300 as a catalyst. For lithium, particles of Li-spinel can be combined with flakes of $MnO_2$—both on carbon particles 300. For aqueous cells, only $MnO_2$ on carbon is needed.

One method can use a catholyte containing, in addition, perfluorcarbon-based artificial blood molecules. These are molecules with more oxygen-carrying capacity than blood. It is also possible to add perfluorodecalin ($C_{10}F_{18}$) molecules, which hold 49 ml of $O_2$ at STP per 100 ml of molecules to a BOP system of catholyte circulation in order to concentrate oxygen in the particle mix as it is introduced into the catholyte reaction chamber, as will be described below.

TVF electrochemical cells of this invention can use air as an oxidizer without the artificial blood or the oxygenator. However, recharge becomes problematical if the $O_2$ cannot be easily absorbed and removed. The oxygenator serves as an efficient $O_2$ equilibrating device.

The oxygen-depleted catholyte is circulated through a membrane oxygenator of any commercial variety with air circulating in the standard manner through the oxygenator instead of the catholyte chamber. Thus, $O_2$ enters the cathode compartment with oxygen enriched catholyte in far greater concentration than the 20% in air and the $O_2$ becomes attached to a particle that readily exchanges the $O_2$ in any suitable reaction or across a membrane that needs to obtain it or to remove excess $O_2$. This technique will work in air-breathing TVF batteries, flow cells and fuel cells.

The oxygenator 650 in the BOP comprises hollow fiber membrane canisters 680 and 682 connected in a fluid loop powered by pump 684. The canisters 680, 682 are filled with perfluorodecalin that is circulated by pump 684 in a circuit 686 shown as dotted lines with white arrows showing direction of perfluorodecalin flow between the canisters 680, 682.

The catholyte flows out of the catholyte storage tank output 648 through the perfluorodecalin canister 680 in the direction of a black arrow, through the outer electrolyte chamber 622, through the catholyte recirculation pipe 632 to the catholyte pump 636 that returns it to catholyte storage tank 644 from which it exits from catholyte storage tank output 648 and returns to the perfluorodecalin canister 680. The perfluorodecalin canister 680 contains a counter-flow of perfluorodecalin with respect to the catholyte so that the catholyte becomes effectively saturated with pure $O_2$.

The perfluorodecalin also flows through canister 682 where is has a circulation path that is counter-flow to air entering the canister 682, as shown by the direction of a black arrow. The perfluorodecalin passing through the canister 682 picks up $O_2$ to its level of saturation, which is 49 ml $O_2$ @STP per 100 ml of the perfluorodecalin. Air is pumped through the canister 682 to supply the $O_2$ and the canister 682 exhaust is virtually pure $N_2$.

The temperature of the perfluorodecalin will increase in the canister 680 because of the heat released by the catholyte. While it is possible to use only one canister (e.g., 680), the use of the canister 682 permits cooling of the perfluorodecalin below its boiling point and increases the amount of $O_2$ that can be transferred to the catholyte without an expense for heating and compressing air.

The lowest pressure in the canister 682 can be that for air. A higher pressure can be for the perfluorodecalin circuit 686 and the highest pressure can be the catholyte. That is because hollow fibers in the canisters 680, 682 support a fairly high pressure differential. Thus, pressures in the cell can be high even though air pressure is low. This technique will work in air-breathing TVF batteries, flow cells and fuel cells.

Pure $O_2$-saturated catholyte immediately starts forming $O^-$ ions if the particles in the catholyte are high surface area carbon or catalyst on carbon. These become $(OH)^-$ or $LiO^-$ ions for aqueous and lithium chemistries, respectively. In short, the ions are ready for reaction as soon as they enter the outer catholyte chamber 622. The effect is to charge chemically an area-dense Electronic Double Layer in IHP 306 and OHP 308 or supercapcitor.

Mixing perfluorodecalin directly with the catholyte will not work because it will cause $O_2$ molecules to permeate the filter, enter into the anolyte chamber and chemically short-circuit the cell. The catholyte must convert the $O_2$ molecules into ions before redox reactions can occur.

Additional Notes

The 3-phase solid catalyst-liquid electrolyte-gaseous fuel or oxidizer reactions would comprise a process in which a gas molecule reaches a catalytic surface by diffusion from within the electrolyte. A typical representation of the 3-phase reaction as applied to the catalytic process in fuel cells is shown in John O'M. Bockris, et al, *MODERN ELECTROCHEMISTRY 2B*, Kluwer Academic, ©2000 at FIG. 13.12, page 1812. Fuel or oxidizer as gases is treated as bubbles in electrolyte at a meniscus boundary between electrolyte and a gas bubble that is in contact with a catalyst surface. Most of the surface area, either gas bubble (dry contact) or electrolyte (wet contact) does not contribute to reaction kinetics (see FIG. 13.13). The current-producing reaction is maximum where the meniscus is thinnest and rapidly drops to zero through 'bulk solution'. That is simply due to the requirement that gas molecules must diffuse through a very thin layer of electrolyte to be effective on catalytic surfaces. References on electrocatalysis refer almost exclusively to such a condition and attribute departures from 'ideal' theory to 'mass transport limitations'. In this invention, the optimally 'thin' gas saturated electrolyte layer, distributed over highly dispersed catalytic surfaces of particles passing rapidly and repeatedly through an active bubble vortex, solves the mass transport 3-phase reaction dilemma of fuel cells.

TVF chamber 122, 124, 522, 524, 622, 624 design uses the parameter, $(r\Omega d/v)(\Omega d^2/v)$ where the first and second factors relate to the Reynolds and Taylor Numbers, respectively. Symbols are as specified in Case A. As a practical matter, the values of r and $\Omega$ should be approximately 3600 rpm. So, as $v$ increases, d should increase proportionally to keep the Reynolds Number within acceptable limits. If the ratio, $d^2/v$ increases by too great a factor, then ratio can be offset by increasing $f\{R_a\}$ with increased axial flow rate for recirculation of the electrolyte. As d increases, the chamber volume and energy capacity increase as well, so larger d is preferred.

As a final note, it is useful to estimate overpotential caused by extracting energy from carbon particles used as an intermediary substrate for faradaic and catalyst particles and the redox reactions they generate. The structure is so fundamental to the method and benefits of this invention that the question has special relevance.

It would be helpful to first review the distinction between chemical and electrochemical potential. If G is the Gibbs free energy associated with a species molar concentration, $n_i$ then: $\Sigma \partial G/\partial n_i = 0$ at equilibrium where $\mu_i \partial G/\partial n_i$ is the chemical potential of each constituent in the system. The Fermi levels may be calculated according to the convention of the Fermi-Dirac distribution function:

$$f(E) = 1/(1+\exp\{[E-\mu]/[k_B T]\}) = 1/(1+\exp\{\in/[k_B T]\})$$

where:
 $\mu$ is the parameter called the chemical potential (which, in general, is a function of T);
 $\in = E-\mu$ is the electron energy measured relative to the chemical potential;
 $k_B$ is Boltzmann's constant; and
 T is the temperature.

A system is at equilibrium when all electrochemical potentials (Fermi levels) are the same. An energy level diagram for the above described process would show a reversible reaction between NiOOH and $Ni(OH)_2$ in the faradic flake attached to the carbon particle substrate; with equilibrium at the Fermi level favoring the discharged state. There can be local deviations from this rule as for solutions at a distance from the active material or EDL adjacent surface. Further, important refinements to the simple distribution function for E and useful for calculations in electrochemistry are elaborated in John O'M. Bockris, et al, *MODERN ELECTROCHEMISTRY 2B*, Kluwer Academic, ©2000, Sections 9.2.6 through 9.4.5, pp: 1471-1495. Those equations are not reproduced here but will be used to refine certain calculations to follow.

Electrochemical potential, $\overline{U}_i = \mu_i + z_i F\phi$, is the sum of the chemical and electrical potentials where the latter is written in molar form. F is Faraday's constant, $\phi$ is electron volts and z is the charge on the ion or number of charges being transferred by each component of the system. Although the system looks complicated, there is one basic issue that takes precedence over others of natural interest. It is formulated as follows: If a faradaic or catalyst particle were able to exchange electrons directly with the metal current collector absent any intermediary loss, expressed as an overvoltage, (for example by substituting metal for carbon) the reaction yields a voltage E=G/zF. The difference G–TdS or enthalpy, H, –Gibbs is the irreversible heat loss. There are some substantial overvoltages going to heat losses in any galvanic process; the ORR being one rather prominent example in fuel cell technology. Disregarding all these other losses for direct comparison purposes, one question is: How much overvoltage is given up with respect to E when the process must first build an EDL on carbon or equivalent high-surface-area, electrically-conducting particle (ECP) intermediary?

The problem addresses evaluation of the electrical potential or capacitance of an EDL charged by a redox chemical process on a freely suspended particle. This is normally considered with respect to fixed porous structures, e.g., Conway, *Electrochemical Supercapacators*, Kluwer Academic (1999) Ch. 14. The EDL of FIGS. 3 & 4 refer to particles suspended in electrolyte which have not been specifically analyzed in the literature; but, Section 6.6 of Bockris et al (Vol. A) treats the central issue; namely, *The Structure of Electrified Interfaces* at great length according to the several models of Helmholtz-Perrin, Gouy-Chapman, Debuy-Huckel and Stern. These are conveniently summarized in FIG. 6.67 on page 885. Equation 6.130 on page 880 of Bockris et al (Vol. A) provides a useful relationship between the EDL capacitance and the PEC surface potential. It is understood to mean that C is proportional to the square root of the bulk ion concentration at elevated temperature such as reasonably applies to the catalyzed oxidation of methanol by NiOOH used in one embodiment of this invention. That simplifies the calculation for that example since charge and surface potential are simply related through C. At standard and lower temperatures, the expression reduces to equation 3.25 of Conway, page 52; but, it is still manageable for the purpose of these conservative estimates. Conway provides some numerical examples for porous electrodes in section 14.3.3 where FIGS. 14.15 and 14.16 and Table 14.2 a "Half-width" that is directly related to the Debye length parameter, $\lambda$.

For free floating ions which our particles tend to emulate the electrical potential is treated by Newman et al, in *Electrochemical Systems*, ©2004, John Wiley, page 101, equations 4.9 and 4.10, reproduced below for their importance to the calculations to follow.

$$\lambda = (\in RT/F^2 \Sigma_i [z_i]^2 c_{i\infty})^{1/2} \quad (4.9)$$

$$\Phi = (z\hat{e}/4\pi\in r)(e^{(a-r)/\lambda})/[1+(a/\lambda)]) \quad (4.10)$$

$\in$ is the dielectric constant of the electrolyte, z are the charge valences of the several ionic species and c are their molar concentrations. ê refers to the charge on the electron so as to distinguish it from natural e and a is essentially the center distance between closest ions. The form of equations 4.9 and 4.10 can be used to estimate the electric potential of the ECP-EDL surface depicted conceptually in Newman et al as FIG. 7.1 on page 175 in Section 7.1, *QUALITATIVE DESCRIPTION OF DOUBLE LAYERS*. The potential can be related directly to the ion concentration extending from the double layer to the bulk electrolyte as exemplified by Newman et al in FIG. 4.1, page 102. The purpose is to evaluate the Nernst equation as follows.

The classical Nernst equation may be approximately formulated as follows:

$$V = \phi_M - \phi_S = \Delta\Phi^\circ - (RT/F)\int_o^\infty \ln\{n_O(x)/n_I(x)\}dx \; x = r/\lambda.$$

Where r is measured from the solid-electrolyte interface (SEI), $n_I$ refers to the molar concentration of constituents mainly occupying the layer up to the IHP and $n_O$ refers to the complementary ions attracted to the layer between the IHP and the OHP. Note the ratio $n_O(x)/n_I(x)$ approaches 1 at $x \approx 3$ and $n_O$ is close to 0 at $x=0$. $V=(\phi_M-\phi_S)$ is the difference in electrical potential between the metal and solution, respectively. Furthermore; $\Delta\Phi^\circ=(\mu^\circ[OHP]+\mu^\circ[e]+\mu[IHP])/F$ represents a standard electrical potential difference where the terms in brackets are standard chemical potentials for the species referred to the OHP and IHP, respectively and includes the chemical potential of an electron in the metal. The EDL loss is E−V.

The integral is approximate and can be adjusted for chemical reaction losses with respect to the initial galvanic process that produced the molar concentrations, $n_O(x)$ and $n_I(x)$. In the estimate now provided, a correction for those catalyzed and faradaic redox reactions is included and further explained below. The main loss considered is due to tunneling through an estimated electropotential barrier needed to initiate reactions on the relevant faradaic and catalytic surfaces. The other values for standard potentials of the relevant constituents have been tabulated. Calculations are tedious and very approximate but appear to show that E−V is about 0.1 to 0.2 volts for the faradaic reaction and 0.2 to 0.3 volts for the catalyzed methanol reaction, both using NiOOH and 250° C. for methanol only.

The tunneling correction to chemical activity potentials can be treated by either of two approximating methods. It may be seen as diminishing the equilibrium level of ions in the EDL and adjusting the integral described above accordingly. Alternatively, by estimating the height of the barrier, $U_o$, and using equation 9.23 in Bockris et al (Vol. A) to compute the potential difference, $U_o$−E as representing the correction to a process without the barrier. Equation 9.23 is based upon the Wentzel-Kramers-Brillouin (WKB) approximation of the tunneling probability distribution:

$$P_T = \exp\{(-4\pi l/h)[2m(U_o-E)]^{1/2}\}$$

where, in this case, m is the mass of a proton, h is Planck's constant. l is an estimated width of the barrier based upon the Debye thickness of ionic displacement at the solid-electrolyte interface. Normally, a tunneling electron has the same potential on either side of the barrier. However, the proton is more than 3-orders of magnitude heavier which leads to some asymmetry in the potentials on either side of the barrier.

The estimated overvoltage associated with using ECP supported galvanically-active materials where ECP is an intermediary to convey electrons to the solid metal current collectors of this invention can be justified by the very considerable increase in current density made possible at the electrode by this novel device. Free floating particle collisions as taught by Chiang et al and Duduta et al are too transitory to interact reliably for electron transfer or ion release. Dispersed carbon in a suspension serves very little purpose unless it forms a polymerized coating on the metal current collectors. Unsupported galvanic materials delay reactions until they come into firm electrical contact with the solid metal. Thus, accelerated reaction rate very greatly increases electron transfer, ion release and associated current density with a minor irreversible loss to heat due to an overvoltage that compares favorably with other comparable sources of overvoltage.

In one embodiment, a galvanic electrochemical cell (100, 500, 600) for converting chemical energy into electrical energy comprises (a) first cylinder-like current collector (106, 506, 606) for connection to an external electrical circuit (114); (b) a second cylinder-like current collector (108, 508, 608) for connection to the external electrical circuit (114) and located with the first current collector (106, 506, 606) so as to define a gap (118, 518, 618) between the current collectors (106, 506, 606, 108, 508, 608); (c) means (128, 130, 136, 142, 536, 538, 636, 638) for circulating fluid in the gap; (d) a cylinder-like filter (120, 414, 520, 620) located in the gap (118, 518, 618); and (e) means (126, 128, 130, 526, 528, 530, 626, 628, 630) for creating relative rotational motion between the filter and at the first and second current collectors so as to create Taylor Vortex Flows (144, 146, 404, 544, 546, 664, 666) in fluid located in the gap (118, 518, 618).

In a second embodiment, The galvanic electrochemical cell (100, 500, 600) comprises in addition means (148, 150, 410, 568, 570, 668, 670) for creating Circular Couette Flows in the fluid in the gap (118, 518, 618).

In three more embodiments, the galvanic electrochemical cell is a battery (102) or a flow cell (502) or a fuel cell (602).

In a sixth embodiment, the galvanic electrochemical cell (100, 500, 600) containing fluid, the fluid is thixotropic.

In a seventh embodiment, the galvanic electrochemical cell (100, 500, 600) contains fluid in the gap (118, 518, 618) and the fluid in the gap (118, 518, 618) between one of the current collectors (106, 506, 606) and the filter (120, 414, 520, 620) is a catholyte; and the fluid in the gap between the other of the current collectors (108, 508, 608) and the filter (120, 414, 520, 620) is an anolyte.

In an eighth embodiment, the galvanic electrochemical cell (100, 500, 600) contains a fluid and the fluid comprises decorated carbon particles (300, 402).

In a ninth embodiment, the galvanic electrochemical cell (100, 500) contains fluid that comprises carbon particles (300, 402) decorated with faradaic material flakes (302).

In a tenth embodiment, the galvanic electrochemical cell (600) contains fluid that comprises carbon particles (300,402) decorated with catalytic material flakes (300).

In an eleventh embodiment, the galvanic electrochemical cell (100, 500, 600) comprises in addition means (650, 680, 682, 684, 686) for transferring oxygen from air to fluid in the gap (118, 518, 618).

In a twelfth embodiment, the galvanic electrochemical cell (100, 500, 600) for converting chemical energy into electrical energy comprises (a) an outer cylinder-like current collector (106, 506, 606); (b) an inner cylinder-like current collector (108, 508, 608); within the outer current collector (106, 506, 606); (c) a cylinder-like, ion-permeable particulate filter (120, 414, 520, 620) dividing a gap (118, 518, 618) between the outer (106, 506, 606); and the inner current collectors (106, 506, 606);) into outer (122, 522, 622) and inner (124, 524, 624) electrolyte chambers for flowing a different electrolyte in each of the chambers (122, 522, 622, 124, 524, 624); and (d) means (126, 128, 130, 526, 528, 530, 626, 628, 630) for providing relative rotation between the filter (120, 414, 520, 620) and an current collectors (106, 506, 606, 108, 508, 608) to create Taylor Vortex Flows (144, 146, 404, 544, 546, 664, 666) in electrolyte in one electrolyte chamber (122, 522, 622, 124, 524, 624).

In a thirteenth embodiment, the galvanic cell electrochemical cell (100, 500, 600) of comprises in addition an electrolyte containing electroconductive particles (300, 402) flowing through one of the electrolyte chambers (122, 522, 622, 124, 524, 624).

In the fourteenth embodiment, the galvanic electrochemical cell (100, 500, 600) contains electroconductive particles (300, 402) that comprise carbon.

In the fifteenth embodiment, the galvanic electrochemical cell (100, 500, 600) comprises electroconductive particles (300, 402) have surface areas of: at least 1,400 square meters per gram.

In the sixteenth embodiment, the galvanic electrochemical cell (100, 500, 600) comprises electroconductive particles (300, 402) that are decorated with faradaic flakes.

In the seventeenth embodiment, the galvanic electrochemical cell (100, 500, 600) comprises electroconductive particles (300, 402) that are decorated with catalytic flakes.

In the eighteenth embodiment, the galvanic electrochemical cell (100, 500, 600) contains means (126, 128, 130, 526, 528, 530, 626, 628, 630) for providing relative rotation between the filter (120, 414, 520, 620) and a current collector (106, 506, 606) to create Taylor Vortex Flows (144, 564, 664) in electrolyte in one electrolyte chamber (122, 522, 622) and comprises means (126, 128, 130, 526, 528, 530, 626, 628, 630) for creating Taylor Vortex Flows (146, 566, 666) in electrolyte in the other electrolyte chamber (124, 524, 624)

Conclusion

The galvanic electrochemical cells 100, 500 and 600 shown as a battery 102, a redox flow cell 502 and a fuel cell 602 of this invention offer electrochemical energy conversion systems far exceeding performances of prior art devices—including the long-standing 1-Ampere/cm$^2$ fuel cell electrode performance barrier of the prior art.

All patents and patent applications identified in this disclosure are hereby incorporated herein by reference.

While the present disclosure has been presented above with respect to the described and illustrated embodiments using TVF and CCF, it is to be understood that the disclosure is not to be limited to those alternatives and described embodiments. Accordingly, reference should be made primarily to the following claims to determine the scope of my invention.

I claim:

1. A galvanic electrochemical cell (100, 500, 600) for converting chemical energy into electrical energy comprising:
    a. a first cylinder-like current collector (106, 506, 606) for connection to an external electrical circuit (114);
    b. a second cylinder-like current collector (108, 508, 608) for connection to the external electrical circuit (114) and located within the first current collector (106, 506, 606) so as to define a gap (118, 518, 618) between the current collectors (106, 506, 606, 108, 508, 608);
    c. means (128, 130, 136, 142, 536, 538, 636, 638) for circulating fluid in the gap (118, 518, 618);
    d. a cylinder-like filter (120, 414, 520, 620) located in the gap (118, 518, 618); and
    e. means (126, 128, 130, 526, 528, 530, 626, 628, 630) for creating relative rotational motion between the filter (120, 414, 520, 620) and the first and second current collectors (106, 506, 606, 108, 508, 608); so as to create Taylor Vortex Flows (144, 146, 404, 544, 546, 664, 666) in fluid located in the gap (118, 518, 618).

2. The galvanic electrochemical cell of claim 1 (100, 500, 600) comprising in addition:
    means (148, 150, 410, 568, 570, 668, 670) for creating Circular Couette Flows (148, 150, 568, 570, 668, 670) in the fluid in the gap (118, 518, 618).

3. The galvanic electrochemical cell of claim 1(100, 500, 600) wherein the cell is a battery (102).

4. The galvanic electrochemical cell of claim 1 (100, 500, 600) wherein the cell is a flow cell (502).

5. The galvanic electrochemical cell of claim 1 (100, 500, 600) wherein the cell is a fuel cell (602).

6. The galvanic electrochemical cell of claim 1 (100, 500, 600) wherein the fluid is thixotropic.

7. The galvanic electrochemical cell of claim 1 (100, 500, 600) wherein:
    a. the fluid in the gap (118, 518, 618) between one of the current collectors (106, 506, 606) and the filter (120, 414, 520, 620) is a catholyte; and
    b. the fluid in the gap between the other of the current collectors (108, 508, 608) and the filter (120, 414, 520, 620) is an anolyte.

8. The galvanic electrochemical cell of claim 1 (100, 500, 600) wherein the fluid comprises:
    decorated carbon particles (300, 402).

9. The galvanic electrochemical cell of claim 1 (100, 500, 600) wherein the fluid comprises:
    carbon particles (300, 402) decorated with faradaic material flakes (302).

10. The galvanic electrochemical cell of claim 1 (100, 500, 600) wherein the fluid comprises:
    carbon particles (300,402) decorated with catalytic material flakes (300).

11. The galvanic electrochemical cell of claim 1 (100, 500, 600) comprising in addition:
    means (650, 680, 682, 684, 686) for transferring oxygen from air to fluid in the gap (118, 518, 618).

12. A galvanic electrochemical cell (100, 500, 600) for converting chemical energy into electrical energy comprising:
    a. an outer cylinder-like current collector (106, 506, 606);
    b. an inner cylinder-like current collector (108, 508, 608); within the outer current collector (106, 506, 606);
    c. a cylinder-like, ion-permeable particulate filter (120, 414, 520, 620) dividing a gap (118, 518, 618) between the outer (106, 506, 606); and the inner current collectors (106, 506, 606);) into outer (122, 522, 622) and inner (124, 524, 624) electrolyte chambers for flowing a different electrolyte in each of the chambers (122, 522, 622, 124, 524, 624); and
    d. means (126, 128, 130, 526, 528, 530, 626, 628, 630) for providing relative rotation between the filter (120, 414, 520, 620) and the current collectors (106, 506, 606, 108, 508, 608) to create Taylor Vortex Flows (144, 146, 404, 544, 564, 664, 666) in the electrolyte in one electrolyte chamber (122, 522, 622, 124, 524, 624).

13. The galvanic cell electrochemical cell (100, 500, 600) of claim 12 comprising in addition:
   an electrolyte containing electroconductive particles (300, 402) flowing through one of the electrolyte chambers (122, 522, 622, 124, 524, 624).

14. The galvanic electrochemical cell (100, 500, 600) of claim 13 wherein the electroconductive particles (300, 402) comprise:
   carbon.

15. The galvanic electrochemical cell (100, 500, 600) of claim 13 wherein the electroconductive particles (300, 402) have surface areas of:
   at least 1,400 square meters per gram.

16. The galvanic electrochemical cell (100, 500) of claim 13 wherein the electroconductive particles (300, 402) are decorated with:
   faradaic flakes (302).

17. The galvanic electrochemical cell (600) of claim 13 wherein the electroconductive particles (300, 402) are decorated with:
   catalytic flakes (302).

18. The galvanic electrochemical cell (100, 500, 600) of claim 12 wherein the means (126, 128, 130, 526, 528, 530, 626, 628, 630) for providing relative rotation between the filter (120, 414, 520, 620) and one current collector (106, 506, 606) to create Taylor Vortex Flows (144, 564, 664) in the electrolyte in one electrolyte chamber (122, 522, 622) comprise:
   means for creating Taylor Vortex Flows (146, 566, 666) in the electrolyte in the other electrolyte chamber (124, 524, 624).

* * * * *